United States Patent
Lee et al.

(10) Patent No.: US 11,613,112 B2
(45) Date of Patent: Mar. 28, 2023

(54) POLARIZING PLATE, POLARIZING PLATE-CARRIER FILM LAMINATE, METHOD FOR PREPARING POLARIZING PLATE-CARRIER FILM LAMINATE, METHOD FOR PREPARING POLARIZING PLATE AND ACTIVE ENERGY RAY CURABLE COMPOSITION

(71) Applicant: SHANJIN OPTOELECTRONICS (SUZHOU) CO., LTD., Zhangjiagang (CN)

(72) Inventors: Mi So Lee, Daejeon (KR); Yoonkyung Kwon, Daejeon (KR); Jin Woo Kim, Daejeon (KR); Dong Uk Kim, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 270 days.

(21) Appl. No.: 16/770,440

(22) PCT Filed: Dec. 14, 2018

(86) PCT No.: PCT/KR2018/015940
§ 371 (c)(1),
(2) Date: Jun. 5, 2020

(87) PCT Pub. No.: WO2019/117675
PCT Pub. Date: Jun. 20, 2019

(65) Prior Publication Data
US 2021/0114359 A1    Apr. 22, 2021

(30) Foreign Application Priority Data
Dec. 15, 2017 (KR) .......................... 10-2017-0173307

(51) Int. Cl.
*B32B 27/38* (2006.01)
*B32B 7/022* (2019.01)
(Continued)

(52) U.S. Cl.
CPC .............. *B32B 27/38* (2013.01); *B32B 7/022* (2019.01); *B32B 7/12* (2013.01); *B32B 27/08* (2013.01);
(Continued)

(58) Field of Classification Search
CPC ............ B32B 2255/10; B32B 2255/24; B32B 2255/26; B32B 2307/732;
(Continued)

(56) References Cited

U.S. PATENT DOCUMENTS

2013/0331476 A1    12/2013  Bae et al.
2014/0106149 A1     4/2014  Seo et al.
(Continued)

FOREIGN PATENT DOCUMENTS

CN    101389981 A    3/2009
CN    104170056 A    11/2014
(Continued)

OTHER PUBLICATIONS

Machine translation of KR 2016-0037811, Choi et al, Apr. 6, 2016 (Year: 2016).*
(Continued)

*Primary Examiner* — Frances Tischler
(74) *Attorney, Agent, or Firm* — Schmeiser, Olsen & Watts, LLP

(57) ABSTRACT

A polarizing plate and a polarizing plate-carrier film laminate are provided. A method for manufacturing a polarizing plate-carrier film laminate and a method for manufacturing a polarizing plate using the same are also provided. A polarizing plate, and an active energy ray curable composition for a polarizing plate are also provided.

18 Claims, 2 Drawing Sheets

(51) Int. Cl.
  *B32B 7/12* (2006.01)
  *B32B 27/08* (2006.01)
  *B32B 27/28* (2006.01)
  *B32B 27/30* (2006.01)
  *B32B 27/36* (2006.01)
  *B32B 37/10* (2006.01)
  *B32B 37/12* (2006.01)
  *G02B 5/30* (2006.01)

(52) U.S. Cl.
  CPC .......... *B32B 27/283* (2013.01); *B32B 27/306* (2013.01); *B32B 27/36* (2013.01); *B32B 37/10* (2013.01); *B32B 37/12* (2013.01); *G02B 5/305* (2013.01); *B32B 2457/20* (2013.01)

(58) Field of Classification Search
  CPC .......... B32B 2307/748; B32B 2457/20; B32B 2551/00; B32B 27/08; B32B 27/283; B32B 27/306; B32B 27/36; B32B 27/38; B32B 37/10; B32B 37/12; B32B 7/022; B32B 7/12; G02B 5/30; G02B 5/305
  See application file for complete search history.

(56) References Cited

U.S. PATENT DOCUMENTS

| | | |
|---|---|---|
| 2015/0277008 A1 | 10/2015 | Huh et al. |
| 2016/0077267 A1 | 3/2016 | Inagaki |
| 2016/0091637 A1 | 3/2016 | Yabushita |
| 2016/0376435 A1 | 12/2016 | Hagenbucher et al. |
| 2017/0210915 A1 | 7/2017 | Lee et al. |

FOREIGN PATENT DOCUMENTS

| | | |
|---|---|---|
| CN | 104781941 A | 7/2015 |
| CN | 105209945 A | 12/2015 |
| CN | 205406494 U | 7/2016 |
| EP | 3054328 A1 | 8/2016 |
| EP | 3144327 A1 | 3/2017 |
| JP | 2011039360 A | 2/2011 |
| JP | 2013160775 A | 8/2013 |
| JP | 2014215472 A | 11/2014 |
| JP | 2017144713 A | 8/2017 |
| JP | 2017149849 A | 8/2017 |
| KR | 20090065017 A | 6/2009 |
| KR | 100938342 B1 | 1/2010 |
| KR | 20140004568 A | 1/2014 |
| KR | 20160015181 A | 2/2016 |
| KR | 20160037117 A | 4/2016 |
| KR | 20160037811 A | 4/2016 |
| KR | 20170041634 A | 4/2017 |
| KR | 20170086961 A | 7/2017 |
| WO | 2007097303 A1 | 8/2007 |

OTHER PUBLICATIONS

International Search Report for Application No. PCT/KR2018/015940 dated May 23, 2019, 2 pages.

Extended European Search Report including Written Opinion for Application No. EP18888059.5, dated Nov. 26, 2020, pp. 1-5.

* cited by examiner

POLARIZING PLATE, POLARIZING PLATE-CARRIER FILM LAMINATE, METHOD FOR PREPARING POLARIZING PLATE-CARRIER FILM LAMINATE, METHOD FOR PREPARING POLARIZING PLATE AND ACTIVE ENERGY RAY CURABLE COMPOSITION

CROSS-REFERENCE TO RELATED APPLICATIONS

The present application is a national stage entry under 35 U.S.C. § 371 of International Application No. PCT/KR2018/015940 filed on Dec. 14, 2018, which claims priority to Korean Patent Application No. 10-2017-0173307 filed in the Korean Intellectual Property Office on Dec. 15, 2017, the entire contents of which are incorporated herein by reference in their entirety.

TECHNICAL FIELD

The present invention relates to a polarizing plate, a polarizing plate-carrier film laminate, a method for manufacturing a polarizing plate-carrier film laminate, a method for manufacturing a polarizing plate, and an active energy ray curable composition.

BACKGROUND ART

An existing polarizing plate for a liquid crystal display device has a configuration in which a general polyvinyl alcohol-based polarizer is used, and a protective film such as PET is attached to at least one surface of the polarizer.

Recently, as the requirements according to low light leakage and thinning have been increased in the polarizing plate market, a method for directly forming a protective film on a polarizer has been studied instead of applying an existing protective base material which is film-formed in advance in order to satisfy these physical properties.

However, when a protective film is directly formed on an existing polyvinyl alcohol-based stretching type polyvinyl alcohol-based polarizer, it was difficult to solve a problem in that a tearing phenomenon of the polarizer occurs due to stress generated by the shrinkage of the polarizer at high temperature as compared to the case of conventionally applying a protective base material on both surfaces.

DETAILED DESCRIPTION OF INVENTION

Technical Problem

The present invention relates to a polarizing plate, a polarizing plate-carrier film laminate, a method for manufacturing a polarizing plate-carrier film laminate, a method for manufacturing a polarizing plate, and an active energy ray curable composition.

Technical Solution

An exemplary embodiment of the present specification provides a polarizing plate comprising: a polarizer; a bonding agent layer and a protective film sequentially provided on one surface of the polarizer; and a protective layer which is directly attached to the other surface of the polarizer, in which the protective layer is a resin layer comprising an active energy ray curable composition comprising an epoxy compound (A), an oxetane compound (B), and a modified siloxane compound (C), or a cured product thereof.

Further, an exemplary embodiment of the present specification provides a polarizing plate-carrier film laminate further comprising: the above-described polarizing plate; and a carrier film on a surface opposite to a surface of the polarizing plate which is brought into contact with the polarizer.

Further, an exemplary embodiment of the present specification provides a method for manufacturing the above-described polarizing plate-carrier film laminate, the method comprising: supplying a carrier film to one surface of a polarizer; supplying a protective film to the other surface of the polarizer; forming a protective layer by supplying an active energy ray curable composition between the polarizer and the carrier film; forming a bonding agent layer by supplying a photocurable bonding agent composition between the polarizer and the protective film; pressurizing a laminate in which the carrier film, the protective layer, the polarizer, the bonding agent layer, and the protective film are sequentially laminated by disposing a pair of pressurization means on each surface of the carrier film and the protective film; and curing the protective layer and the bonding agent layer by irradiating the protective layer and the bonding agent layer with an active energy ray.

In addition, an exemplary embodiment of the present specification provides a method for manufacturing a polarizing plate, the method comprising: peeling off the carrier film from the protective layer of the above-described polarizing plate-carrier film laminate.

Furthermore, an exemplary embodiment of the present specification provides a polarizing plate manufactured by the above-described method for manufacturing a polarizing plate.

Further, an exemplary embodiment of the present specification provides an active energy ray curable composition for a polarizing plate protective layer, comprising an epoxy compound (A), an oxetane compound (B), and a modified siloxane compound (C).

Advantageous Effects

A polarizing plate according to an exemplary embodiment of the present specification has an effect in that the bonding strength of a protective layer with respect to a polarizer is improved.

A polarizing plate-carrier film laminate according to an exemplary embodiment of the present specification has an effect in that peeling properties of a carrier film and a protective layer are improved.

A method for manufacturing a polarizing plate according to an exemplary embodiment of the present specification has an effect in that a blocking phenomenon is suppressed in a process of peeling off a carrier film from a protective layer.

A polarizing plate manufactured by the method for manufacturing a polarizing plate using the polarizing plate-carrier film laminate according to an exemplary embodiment of the present specification has an effect in that optical properties are improved.

A method for manufacturing a polarizing plate using the polarizing plate-carrier film laminate according to an exemplary embodiment of the present specification has an effect in that processability is improved by using a roll-to-roll process in order to peel off a carrier film.

EXPLANATION OF REFERENCE NUMERALS AND SYMBOLS

Figure 1:
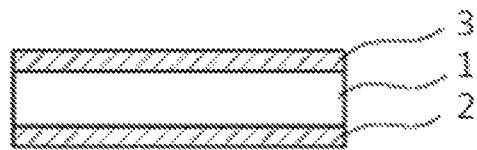
FIG. 1 is a cross-sectional view of a polarizing plate according to an exemplary embodiment of the present specification.

1: Polarizer
2: Protective layer
3: Protective film
4: Adhesive agent layer
5: Carrier film
6: Polarizing plate
7: Image display panel
10, 20: Pressurization roll
30, 40: Traveling roll
50: Bonding agent composition application means
60: Active energy ray irradiation means
70: Application means of a composition for forming a protective layer
100: Polarizer
110: Polarizer roll
200: Carrier film
210: Carrier film roll
300: Protective film
310: Protective film roll
500: Polarizing plate winding roll

BEST MODE

Hereinafter, the present invention will be described.

In the present specification, the fact that two or more elements are sequentially provided, for example, the term "A and B" sequentially provided also comprises a case where the elements A and B are disposed in the order and another element is interposed between A and B, for example, a case where A, C, and B are disposed in this order.

Further, in the present specification, the fact that two elements are attached to each other or directly attached, for example, the term "B is directly attached to A" may mean a case where another element is not interposed on at least one main surface of A, and B is directly attached to the surface.

In the present specification, the term "curing of a composition" means a process in which the composition changes so as to be capable of exhibiting bonding or adhesion characteristics due to physical actions or chemical reactions, and the like of components of the composition. Further, in the present specification, the term "active energy ray" may mean not only microwaves, infrared ray (IR), ultraviolet (UV) ray, X-ray, and γ-ray, but also a particle beam such as an α particle beam, proton beam, neutron beam, and electron beam, and may be typically ultraviolet (UV) ray or electron beam. In addition, the term "active energy ray curable" as described above may mean that the curing as described above may be induced by irradiation of an active energy ray. In one example of the present invention, curing of the active energy ray curable composition may be performed through free radical polymerization or cation reaction by irradiation of an active energy ray, and may be preferably performed as the free radical polymerization and the cation reaction simultaneously or sequentially proceed.

Since a polarizer is typically manufactured of a hydrophilic resin such as polyvinyl alcohol, the polarizer is generally vulnerable to moisture. In addition, since a stretching process is generally performed in the manufacture of the polarizer, contraction easily occurs under a humid condition, and thus there is a problem in that optical characteristics of the polarizing plate, and the like are degraded. Accordingly, to typically reinforce physical properties of a polarizer, a protective film represented by a polyethylene terephthalate (PET) film is generally attached to both surfaces of the polarizer, and when there is no protective film, there are problems in that due to poor dimensional stability of the polarizer, durability and optical properties greatly deteriorate, and water resistance is dramatically decreased.

To this end, in one exemplary structure of the polarizing plate of the present invention, since a protective film is not attached to at least one surface of the polarizer, a thinner and lighter structure is implemented and simultaneously, a structure in which a protective layer is directly attached to the surface of the polarizer to which the protective film is not attached is employed.

In the specification, a polarizing plate in which attachment of the protective film is omitted on at least one surface of the polarizer as described above may also be referred to as a thin polarizing plate (thin polarizer).

In the method for manufacturing a polarizing plate, the roll-to-roll process may be performed as a continuous process, so that there is an advantage in that production yield is high and the process is very economical.

However, when a carrier film is used in order to laminate the protective layer, the bonding strength of the carrier film and the protective layer is high in a process of winding the film, so that there is a problem in that a phenomenon in which the carrier film and the protective layer adhere to each other in a process of peeling off the carrier film from the protective layer during a process of manufacturing a polarizing plate, that is, a blocking phenomenon occurs.

Further, in order to form a protective layer during a process of manufacturing a polarizing plate, when a composition for forming a protective layer is applied onto a polarizer, a bonding strength with another configuration is imparted to the composition for forming a protective layer, and a carrier film is provided on the composition for forming a protective layer in order to prevent the composition from being washed away. Thereafter, after the composition for forming a protective layer is cured, the carrier film is peeled off, but due to the bonding property of the composition for forming a protective layer, there are problems in that a part of the carrier film falls off from the protective layer at the time of peeling off the carrier film, and optical characteristics of a polarizing plate are inhibited.

In particular, the polarizing plate-carrier film laminate is stored for a long period of time, if necessary in some cases, and the above-described blocking phenomenon may more severely occur while the time when the protective layer and the carrier film are attached to each other is prolonged.

Thus, the present invention intends to suppress the above-described blocking phenomenon which may occur during the process of manufacturing a polarizing plate by comprising the modified siloxane compound in an ultraviolet ray curable composition for forming a protective layer to have an effect of increasing adhesion between the protective layer and a polarizer and simultaneously decreasing adhesion between the protective layer and the carrier film, that is, a conflicting effect.

Figure 2:
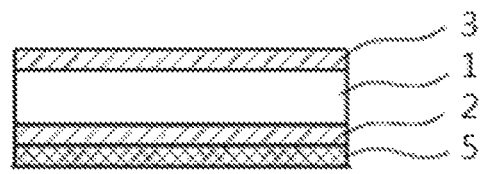
FIG. 2 is a cross-sectional view of a polarizing plate-carrier film laminate according to an exemplary embodiment of the present specification.

As illustrated in FIG. 2, the present specification provides a polarizing plate comprising: a polarizer 1; a bonding agent layer and a protective film 3 sequentially provided on one surface of the polarizer 1; a protective layer 2 and a carrier film 5 sequentially provided on the other surface of the polarizer 1, in which the protective layer is directly attached to the polarizer, and the protective layer is a cured resin layer composed of an active energy ray curable composition comprising an epoxy compound (A), an oxetane compound (B), and a modified siloxane compound (C).

Further, the present specification provides a polarizing plate-carrier film laminate further comprising a carrier film on a surface opposite to a surface of the polarizing plate which is brought into contact with the polarizer.

The polarizing plate-carrier film laminate is used for manufacturing a polarizing plate, and may be used as a polarizing plate after being subjected to a process of peeling off a carrier film.

When the polarizing plate-carrier film laminate is used for manufacturing a polarizing plate, the polarizing plate-carrier film laminate has an effect in that a blocking phenomenon of the carrier film and the protective layer is suppressed because a bonding strength between the protective layer and the carrier film is low even when the carrier film is peeled off. That is, the above-described blocking phenomenon may be suppressed by adjusting the peel strength of the protective layer of the polarizing plate-carrier film laminate with respect to the polarizer at a high level, and adjusting the peel strength of the protective layer with respect to the carrier film at a low level.

The blocking phenomenon may be solved as the bonding strength (X1) of the protective layer with respect to the polarizer is maintained at a high level and the peel strength (X3) of the protective layer with respect to the carrier film is adjusted to a low value.

In an exemplary embodiment of the present specification, the bonding strength (X1) of the protective layer with respect to the polarizer may be 4B or more, 4B to 5B, preferably 5B when measured by the ASTM standard cross-cut tape test in accordance with D3359-87. The bonding strength of the protective layer with respect to the polarizer may be a value measured after the polarizing plate-carrier film laminate is left to stand at room temperature (25° C.) and a relative humidity of 30% to 45% for 1 hour to 100 hours, and may be preferably a value measured at a relative humidity of 43%.

When the bonding strength (X1) of the protective layer with respect to the polarizer is the same as the numerical value, the bonding strength of the protective layer with respect to the polarizer is excellent, so that it is possible to suppress a phenomenon in which the protective layer is lifted from the polarizer when the carrier film is peeled off from the protective layer. In addition, when the bonding strength is less than 4B, the polarizer may be discolored or polarizing characteristics may deteriorate.

The bonding strength (X1) of the protective layer with respect to the polarizer may be measured by a cross-cut tape test.

As the cross-cut test method, a cutting guide, an appropriate ruler, or the like is placed on a protective layer from which a carrier film is peeled off, and grid shapes are drawn horizontally and vertically in the form of go board grids with an interval of 1 mm on the sample, by using a cross cutter. Thereafter, the surface of the protective layer is cleaned by a brush or a dust-free cloth, and then Nichiban tape (cellophane tape manufactured by Nichiban Co., Ltd.) is attached to the surface, and with respect to the peeled surface after the protective layer is sharply peeled off at a peel angle of 180 degrees, it is observed by the unaided eye how much the protective layer falls off. According to the cross-cut classification standard (ASTM) of the following Table 1, the degree of bonding is divided into 0B to 5B.

TABLE 1

| ASTM | Remaining area % |
|------|------------------|
| 5B   | 100              |
| 4B   | 95 or more and less than 100 |
| 3B   | 85 or more and less than 95  |
| 2B   | 65 or more and less than 85  |
| 1B   | 45 or more and less than 65  |
| 0B   | 45 or less       |

In an exemplary embodiment of the present specification, X2 calculated according to the following General Equation 1 may be 0.95 to 1, preferably 0.96 to 1, and more preferably 0.99 to 1.

$X2 = $(Area of the remaining protective layer after the ASTM standard cross-cut tape test)/(Area of the entire peeled surface) [General Equation 1]

In General Equation 1, the ASTM standard cross-cut tape test may be performed by an ASTM standard cross-cut tape test in accordance with the D3359-87.

In General Equation 1, the area of the entire peeled surface may mean an entire area on which a tape attached to the protective layer for the ASTM standard cross-cut tape test is brought into contact with the protective layer.

In an exemplary embodiment of the present specification, the peel strength (X3) of the protective layer with respect to the carrier film may be 40 gf/5 cm or less, preferably 30 gf/5 cm or less, and more preferably 10 gf/5 cm or less. When the numerical range is satisfied, it is possible to effectively suppress a blocking phenomenon of the protective layer and the carrier film from occurring at the time of peeling off the carrier film.

The peel strength (X3) of the protective layer with respect to the carrier film may be measured at 180° and a rate of 30 m/min in accordance with the ASTM D3330. For example, the peel strength (X3) may be measured by using a film high-speed peeling machine (CBT-4720, Chungbuk Tech).

Furthermore, the peel strength (X3) of the protective layer with respect to the carrier film may be a value measured after the polarizing plate-carrier film laminate is left to stand at room temperature (25° C.) and a relative humidity of 30% to 45% for 1 hour to 100 hours, and may be preferably a value measured at a relative humidity of 43%.

In an exemplary embodiment of the present specification, a value (X3/X2) of X3 divided by X2 may be 45 gf/5 cm or less, 30 gf/5 cm or less, or 10 gf/5 cm or less. In this case, the bonding strength of the protective layer with respect to the polarizer is high, whereas the bonding strength of the protective layer with respect to the carrier film is low, so that it is possible to prevent the protective layer from being lifted at the interface with the polarizer and to easily peel off the carrier film during the process of peeling off the carrier film in a process of manufacturing a polarizing plate. That is, peeling defects may be alleviated.

Modified Siloxane Compound (C)

In an exemplary embodiment of the present specification, the active energy ray curable composition comprises a modified siloxane compound (C). In this way, it is possible to satisfy the relationship between a peel strength (X1) of the protective layer with respect to the polarizer and a peel strength (X3) of the protective layer with respect to the carrier film, that is, a numerical range of the peel strength (X1) of the protective layer with respect to the polarizer and the peel strength (X3) of the protective layer with respect to the carrier film.

The modified siloxane compound (C) may be included in an amount of 0.01 to 6.8 parts by weight, preferably 0.1 to 6.5 parts by weight, and more preferably 0.4 to 5 parts by weight, based on 100 parts by weight of the epoxy compound (A). When the numerical range is satisfied, the lubricity by silicon atoms included in the modified siloxane compound may be maximized, and the abrasion resistance of the protective layer may be improved. Further, when the content is more than 6.8 parts by weight, the heat resistance of the protective layer may deteriorate. In addition, when the numerical range is satisfied, at the time of forming a protective layer by using the active energy ray curable composition, the peel strength of the protective layer with respect to the carrier film may be adjusted to a predetermined level or less while maintaining an excellent peel strength of the protective layer with respect to the polarizer. For this reason, it is possible to effectively suppress the blocking phenomenon from occurring during the process of peeling off the carrier film.

The modified siloxane compound (C) may be a water-dispersible modified siloxane compound.

The modified siloxane compound has a structure in which ethylene oxide which serves as a hydrophilic portion and a silicon moiety which serves as a hydrophobic portion in the molecule thereof are bonded to each other as a single molecule, may impart the lubricity of silicon to the surface of the protective layer, and serves to improve abrasion resistance of the protective layer.

In the present specification, the modified siloxane compound (C) may have an organic group in various forms in the siloxane (Si—O—Si) main chain. For example, the modified siloxane compound (C) may comprise a repeating unit represented by the following Formula C1.

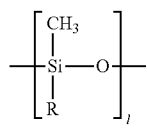

[Formula C1]

In Formula C1, R may be hydrogen; an alkyl group; an alkylaryl group; an aralkyl group; an amino group; a carbonyl group; a polyether group; or an epoxy group, and a preferred example thereof may be a polyether group. Specifically, when R is a polyether group, the modified siloxane compound (C) may be referred to as a polyether modified siloxane compound.

In an exemplary embodiment of the present specification, the modified siloxane compound (C) may be a polyether modified siloxane compound.

Furthermore, in Formula C1, l may be an integer of 1 to 5.

The polyether modified siloxane compound (C) is a compound in which a polyether structure is introduced into a siloxane having Si—O—Si which is a siloxane bond. For example, it is possible to use a compound having Si—O—Si which is a siloxane bond, in which end groups are a trimethylsilyl group (Si(CH$_3$)$_3$) and a polyether structure comprising an ether bond (—O—) is substituted in at least one of Si constituting the siloxane bond.

In an exemplary embodiment of the present specification, the polyether modified siloxane compound (C) may be represented by the following Formula C2 or C3.

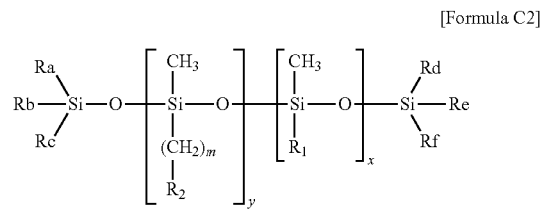

[Formula C2]

In Formula C2,
at least one of $R_1$ and $R_2$ is —($R_{11}$O)p$R_{12}$, and the other is an alkyl group; an alkylaryl group; an aralkyl group; an alkylaryl group; an amino group; a carbonyl group; or an epoxy group,
$R_{11}$ is a direct bond; or an alkylene group,
$R_{12}$ is an alkyl group; an alkylaryl group; or an aralkyl group,
m and p are each independently an integer of 1 to 10, and x and y are each 0 to 10, provided that x+y is 1 or more, and
Ra to Rf are the same as or different from each other, and are each independently hydrogen; an alkyl group; or polyethylene glycol.

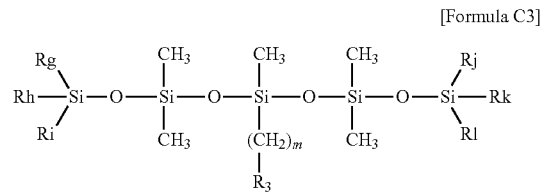

[Formula C3]

In Formula C3,
$R_3$ is —($R_{11}$O)p$R_{12}$,
$R_{11}$ is a direct bond; or an alkylene group,
$R_{12}$ is an alkyl group; an alkylaryl group; or an aralkyl group,
m and p are each independently an integer of 1 to 10, and
Rg to Rl are the same as or different from each other, and are each independently hydrogen, an alkyl group, or polyethylene glycol.

In Formulae C1 to C3, the alkyl group may be a C1-C10 straight-chained or branched alkyl group, and the aryl group may be a C6-C20 monocyclic or polycyclic aryl group. Specifically, the alkyl group may be methyl, ethyl, propyl, butyl, and the like, and the aryl group may be phenyl, naphthyl, biphenylyl, anthryl, and the like. The alkylaryl group is an aryl group substituted with an alkyl group, and the examples may be applied to an alkyl group and an aryl group. The aralkyl group is an alkyl group substituted with an aryl group, and the examples may be applied to an alkyl group and an aryl group.

In Formulae C2 and C3, polyethylene glycol may be represented by —(OCH$_2$CH$_2$)nR, n is an integer of 1 to 10, and R is hydrogen, an alkyl group, or an OH group.

A hydrophile-lipophile balance (HLB) value of the polyether modified siloxane compound may be 0 to 12, preferably 0 to 10, and more preferably 4 to 10. When the numerical range is satisfied, compatibility with other components is excellent, and when the value is more than 12 and the hydrophilicity is high, compatibility deteriorates.

In this case, the hydrophile-lipophile balance represents a ratio of a hydrophilic moiety to a lipophilic moiety of the polyether modified siloxane compound. The hydrophile-lipophile balance is determined according to the compound, and the ratio for each compound is publicly known. The hydrophile-lipophile balance may be calculated by using a method publicly known in the art, for example, the following [Equation 1]. In general, the HLB value means that the higher the numerical value is, the higher the hydrophilicity is, and the smaller the numerical value is, the higher the lipophilicity.

$$HLB=20\times(\text{molecular weight of the hydrophilic moiety/molecular weight of the compound}) \quad \text{[Equation 1]}$$

The [Equation 1] is defined by Griffin, and is an equation capable of obtaining a hydrophile-lipophile balance (HLB) of a general compound.

The polyether modified siloxane compound may have a weight average molecular weight (Mw) of 500 to 10,000, preferably 500 to 5,000, and more preferably 1,000 to 3,000. When the numerical range is satisfied, it is possible to exhibit excellent miscibility.

The polyether modified siloxane compound (C) may be obtained, for example, by grafting an organic compound having an unsaturated bond and a polyoxyalkylene group with a polyorganosiloxane main chain having a hydrogenated silicon group through a hydrosilylation reaction. Specific examples thereof comprise a dimethylsiloxane methyl (polyoxyethylene) siloxane copolymer, a dimethylsiloxane methyl(polyoxyethylene) siloxane methyl(polyoxypropylene) siloxane copolymer, a dimethylsiloxane methyl(polyoxypropylene) siloxane polymer, and the like.

By blending the polyether modified siloxane compound with a composition which forms a protective layer, the bonding strength of the composition with respect to a polarizer may be improved, and a blocking phenomenon may be effectively prevented in a process of peeling off a carrier film in the future by reducing the bonding strength with respect to a protective film.

Epoxy Compound (A) and Oxetane Compound (B)

In an exemplary embodiment of the present specification, the active energy ray curable composition may comprise an epoxy compound (A) and an oxetane compound (B) other than the above-described modified siloxane compound (C).

The protective layer may comprise an active energy ray curable composition comprising an epoxy compound (A) or an oxetane compound (B) in a cured state.

The active energy ray curable composition may comprise the oxetane compound (B) in an amount of 5 to 100 parts by weight, preferably 10 to 90 parts by weight, and more preferably 15 to 60 parts by weight, based on 100 parts by weight of the epoxy composition (A). When the epoxy compound and the oxetane compound are included within the content range, more effective curing of the active energy ray curable composition may be induced, and even in a state where irradiation with the active energy ray is completed, physical properties may be improved by more efficiently performing curing due to living characteristics of the cationic reaction.

In the present specification, the unit "parts by weight" means ratio of weights between respective components. By adjusting the ratio of the components of active energy ray curable composition as described above, it is possible to provide a protective layer which is excellent in curing efficiency of the composition and physical properties after curing the composition.

In the present specification, the term "epoxy compound" may mean a monomeric, oligomeric or polymeric compound comprising one or more, preferably two or more epoxy groups.

An epoxy compound may improve physical properties such as water resistance or bonding strength of the protective layer.

As the epoxy compound, it is possible to use, for example, those capable of being crosslinked or polymerized by a cationic reaction.

As an epoxy compound in one example, it is possible to use an epoxy resin having a weight average molecular weight (Mw) of 1,000 to 5,000, preferably 2,000 to 4,000. In the present specification, a weight average molecular weight means a numerical value converted with respect to reference polystyrene measured by gel permeation chromatography (GPC), and unless otherwise specifically defined, the term "molecular weight" means "a weight average molecular weight". The durability of the protective layer may be appropriately maintained by adjusting the molecular weight to 1,000 or more, and the workability such as the coatability of the composition may also be effectively maintained by adjusting the molecular weight to 5,000 or less.

As the epoxy compound, for example, it is possible to use one or more selected from the group comprising an alicyclic epoxy compound and a glycidyl ether-type epoxy compound.

In an exemplary embodiment of the present specification, as the epoxy compound, it is possible to use a mixture of an alicyclic epoxy compound and a glycidyl ether-type epoxy compound.

In this case, the alicyclic epoxy compound and the glycidyl ether-type epoxy compound may be included at a weight ratio of 1:1 to 10:1, preferably 1:1 to 4:1, and more preferably 1:1 to 5:1.

In the present specification, the term "alicyclic epoxy compound" may mean a compound comprising one or more epoxidized aliphatic ring groups, and the term "glycidyl ether-type epoxy compound" may mean a compound comprising at least one or more glycidyl ether groups.

An alicyclic epoxy compound is included in the epoxy compound to increase the glass transition temperature of an active energy ray curable composition which forms a protective layer, thereby allowing the protective layer to secure sufficient durability, so that even though the protective layer is directly formed on any one surface of a polarizer without interposing a protective film, it is possible to prevent cracks of the polarizer from occurring even under heat resistance or heat impact conditions.

In the alicyclic epoxy compound comprising an epoxidized aliphatic ring group, the epoxidized aliphatic ring group may mean, for example, a compound having an epoxy group formed in an alicyclic ring. A hydrogen atom constituting the alicyclic ring may also be arbitrarily substituted with a substituent such as an alkyl group. As the alicyclic epoxy compound, for example, a compound to be specifically exemplified below may be used, but an available epoxy compound is not limited to the following types.

As the alicyclic epoxy compound, an epoxycyclohexylmethyl epoxycyclohexanecarboxylate-based compound represented by the following [Formula 1] may be exemplified.

[Formula 1]

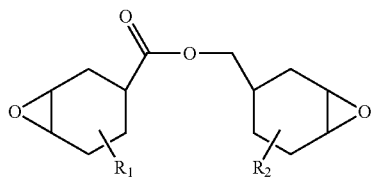

In Formula 1, $R_1$ and $R_2$ each independently represent hydrogen or an alkyl group.

In the present specification, the term 'alkyl group' may mean a straight-chained, branched, or cyclic alkyl group having 1 to 20, 1 to 16, 1 to 12, 1 to 8, or 1 to 4 carbon atoms, unless otherwise specifically defined, and the alkyl group may be in a state of being arbitrarily unsubstituted or substituted with one or more substituents.

Other examples of the alicyclic epoxy compound comprise an epoxycyclohexane carboxylate-based compound of an alkanediol, which is represented by the following Formula 2.

[Formula 2]

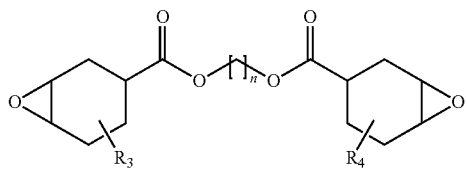

In Formula 2, $R_3$ and $R_4$ each independently represent hydrogen or an alkyl group, and n represents an integer of 2 to 20.

Further, still other examples of the alicyclic epoxy compound comprise an epoxycyclohexylmethyl ester-based compound of a dicarboxylic acid, which is represented by the following Formula 3.

[Formula 3]

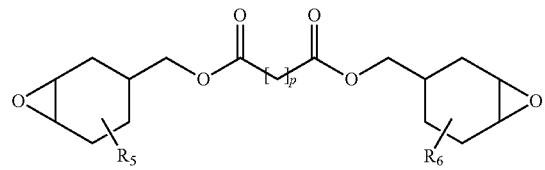

In Formula 3, $R_5$ and $R_6$ each independently represent hydrogen or an alkyl group, and p represents an integer of 2 to 20.

Yet other examples of the alicyclic epoxy compound comprise an epoxycyclohexylmethyl ether-based compound of polyethylene glycol, which is represented by the following Formula 4.

[Formula 4]

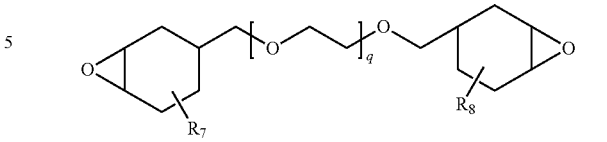

In Formula 4, $R_7$ and $R_8$ each independently represent hydrogen or an alkyl group, and q represents an integer of 2 to 20.

Still yet other examples of the alicyclic epoxy compound comprise an epoxycyclohexylmethyl ether-based compound of alkanediol, which is represented by the following Formula 5.

[Formula 5]

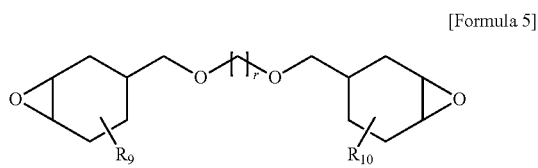

In Formula 5, $R_9$ and $R_{10}$ each independently represent hydrogen or an alkyl group, and r represents an integer of 2 to 20.

Further examples of the alicyclic epoxy compound comprise a diepoxy trispiro-based compound represented by the following Formula 6.

[Formula 6]

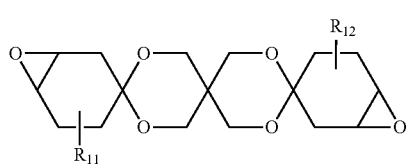

In Formula 6, $R_{11}$ and $R_{12}$ each independently represent hydrogen or an alkyl group.

Other further examples of the alicyclic epoxy compound comprise a diepoxy monospiro-based compound represented by the following Formula 7.

[Formula 7]

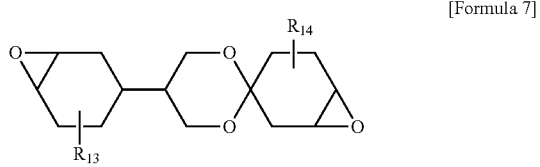

In Formula 7, $R_{13}$ and $R_{14}$ each independently represent hydrogen or an alkyl group.

Still other further examples of the alicyclic epoxy compound comprise a vinylcyclohexene diepoxide compound represented by the following Formula 8.

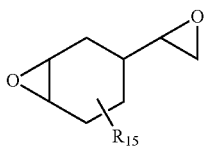

[Formula 8]

In Formula 8, $R_{15}$ represents hydrogen or an alkyl group.

Yet other further examples of the alicyclic epoxy compound comprise an epoxycyclopentyl ether compound represented by the following Formula 9.

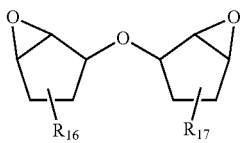

[Formula 9]

In Formula 9, $R_{16}$ and $R_{17}$ each independently represent hydrogen or an alkyl group.

Still yet other further examples of the alicyclic epoxy compound comprise a diepoxy tricyclo decane compound represented by the following Formula 10.

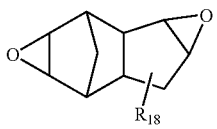

[Formula 10]

In Formula 10, Rig represents hydrogen or an alkyl group.

As the alicyclic epoxy compound, more specifically, it is preferred that an epoxycyclohexylmethyl epoxycyclohexanecarboxylate compound, an epoxycyclohexane carboxylate compound of an alkanediol, an epoxycyclohexylmethyl ester compound of a dicarboxylic acid or an epoxycyclohexylmethyl ether compound of an alkanediol is used, and it is possible to preferably use one or more selected from the group consisting of an esterification product of 7-oxabicyclo [4,1,0]heptane-3-carboxylic acid and (7-oxa-bicyclo[4,1,0] hepto-3-yl) methanol (a compound in which $R_1$ and $R_2$ are hydrogen in Formula 1); an esterification product of 4-methyl-7-oxabicyclo[4,1,0]heptane-3-carboxylic acid and (4-methyl-7-oxa-bicyclo[4,1,0]hepto-3-yl)methanol (a compound in which $R_1$ is 4-$CH_3$, and $R_2$ is 4-$CH_3$ in Formula 1); an esterification product of 7-oxabicyclo[4,1,0]heptane-3-carboxylic acid and 1,2-ethanediol (a compound in which $R_3$ and $R_4$ are hydrogen, and n is 1 in Formula 2); an esterification product of (7-oxabicyclo[4,1,0]hepto-3-yl)methanol and adipic acid (a compound in which $R_5$ and $R_6$ are hydrogen, and p is 2 in Formula 3); an esterification product of (4-methyl-7-oxabicyclo[4,1,0]hepto-3-yl)methanol and adipic acid (a compound in which $R_5$ and $R_6$ are 4-$CH_3$, and p is 2 in Formula 3); and an etherification product of (7-oxabicyclo[4,1,0]hepto-3-yl)methanol and 1,2-ethanediol (a compound in which $R_9$ and $R_{10}$ are hydrogen, and r is 1 in Formula 5), but the alicyclic epoxy compound is not limited thereto.

Further, the glycidyl ether-type epoxy compound may be included in the epoxy compound, thereby improving the bonding strength of the protective layer with respect to the polarizer by forming a chain which is soft and polar in the protective layer after a glycidyl ether reactive group is subjected to a curing reaction.

In the glycidyl ether-type epoxy compound, for example, an aliphatic polyhydric alcohol or an alkylene oxide thereof, for example, a polyglycidyl ether of an ethylene oxide or propylene oxide adduct may be included.

In one example, when a mixture of an alicyclic epoxy compound and a glycidyl ether-type epoxy compound is used as the epoxy compound (A), as the foregoing alicyclic epoxy compound, 3,4-epoxycyclohexylmethyl, 3,4-epoxy-cyclohexanecarboxylate, bis(3,4-epoxycyclohexylmethyl) adipatedicyclopentadienedioxi de, limonenedioxide or 4-vinylcyclohexenedioxide, and the like may be exemplified, and as the glycidyl ether-type epoxy compound, an epoxy compound having an epoxy group, other than an alicyclic epoxy group may be used. That is, as a specific glycidyl ether-type epoxy compound, it is possible to exemplify novolac epoxy, bisphenol A-based epoxy, bisphenol F-based epoxy, brominated bisphenol epoxy, n-butyl glycidylether, aliphatic glycidylether (12 to 14 carbon atoms), 2-ethylhexylglycidyl ether, phenyl glycidyl ether, o-cresyl glycidyl ether, nonyl phenyl glycidyl ether, ethyleneglycol diglycidylether, diethyleneglycol diglycidylether, propyleneglycol diglycidylether, tripropyleneglycol diglycidylether, neopentylglycol diglycidylether, 1,4-butanediol diglycidylether, 1,6-hexanediol diglycidylether, trimethylolpropane triglycidylether, trimethylolpropane diglycidylether, trimethylolpropane polyglycidylether, polyethyleneglycol diglycidylether or glycerin triglycidylether and the like, and a glycidyl ether having a cyclic aliphatic backbone such as 1,4-cyclohexanedimethanol diglycidyl ether or a hydrogenated compound of an aromatic epoxy compound, and the like may be exemplified, and preferably, a glycidyl ether having a cyclic aliphatic backbone, a glycidyl ether having a cyclic aliphatic backbone having preferably 3 to 20 carbon atoms, preferably 3 to 16 carbon atoms, and more preferably 3 to 12 carbon atoms may be used, but the glycidyl ether-type epoxy compound is not limited thereto.

Next, the oxetane compound is a compound having a four-membered cyclic ether in the molecule thereof, and examples thereof comprise 3-ethyl-3-hydroxymethyl-oxetane, 1,4-bis[(3-ethyl-3-oxetanyl)methoxymethyl]benzene, 3-ethyl-3-(phenoxymethyl)oxetane, di[(3-ethyl-3-oxetanyl) methyl]ether, 3-ethyl-3-(2-ethylhexyloxymethyl)oxetane, phenol novolac oxetane, and the like, but are not limited thereto. As these oxetane compounds, commercially available products can be easily purchased, and specific examples thereof comprise Aron Oxetane OXT-101 (manufactured by Toagosei Co., Ltd.), Aron Oxetane OXT-121 (manufactured by Toagosei Co., Ltd.), Aron Oxetane OXT-211 (manufactured by Toagosei Co., Ltd.), Aron Oxetane OXT-221 (manufactured by Toagosei Co., Ltd.), Aron Oxetane OXT-212 (manufactured by Toagosei Co., Ltd.), and the like.

In an exemplary embodiment of the present specification, the active energy ray curable composition may further comprise a curable component, and the curable component may be a compound having a (meth)acryloyl group and a compound having a plurality of polymerizable double bonds such as a vinyl group. Examples thereof comprise tripropylene glycol diacrylate, 1,9-nonane diol diacrylate, tricyclodecanedimethanol diacrylate, cyclic trimethylolpropane formal acrylate, dioxane glycol diacrylate, EO-modified diglycerin tetraacrylate, Aronix M-220 (manufactured by Toagosei Co., Ltd.), LIGHT ACRYLATE 1,9ND-A (manufactured by Kyoeisha Chemical Co., Ltd.), LIGHT ACRYLATE DGE-4A (manufactured by Kyoeisha Chemical Co., Ltd.), LIGHT ACRYLATE DCP-A (manufactured by Kyoeisha Chemical Co., Ltd.), SR-531 (manufactured by Sartomer Company, Inc.), CD-536 (manufactured by Sartomer Company, Inc.), and the like. In addition, examples thereof comprise various epoxy (meth)acrylates, urethane (meth) acrylates, polyester (meth)acrylates, or various (meth)acrylate-based monomers, and the like, if necessary. When the curable component is included, there are advantages in that the curing rate may be increased, and a high level of curing can be achieved even in a low light amount.

In an exemplary embodiment of the present specification, the curable component may be included in an amount of 10 to 50 parts by weight or 20 to 40 parts by weight based on 100 parts by weight of the epoxy compound (A).

In the present specification, the unit "parts by weight" means ratio of weights between respective components. By adjusting the ratio of the components of active energy ray curable composition as described above, it is possible to provide a protective layer which is excellent in curing efficiency of the composition and physical properties after curing the composition.

In an exemplary embodiment of the present specification, the active energy ray curable composition may further comprise a photoinitiator.

Examples of the photoinitiator comprise: an α-hydroxyketone-based compound (for example, IRGACURE 184, IRGACURE 500, IRGACURE 2959, DAROCUR 1173; manufactured by Ciba Specialty Chemicals Inc.); a phenylglyoxylate-based compound (for example, IRGACURE 754, DAROCUR MBF; manufactured by Ciba Specialty Chemicals Inc.); a benzyldimethylketal-based compound (for example, IRGACURE 651; manufactured by Ciba Specialty Chemicals Inc.); an α-aminoketone-based compound (for example, IRGACURE 369, IRGACURE 907, IRGACURE 1300; manufactured by Ciba Specialty Chemicals Inc.); a monoacyl phosphine-based compound (MAPO) (for example, DAROCUR TPO; manufactured by Ciba Specialty Chemicals Inc.); a bis acyl phosphine-based compound (BAPO) (for example, IRGACURE 819, IRGACURE 819DW; manufactured by Ciba Specialty Chemicals Inc.); a phosphine oxide-based compound (for example, IRGACURE 2100; manufactured by Ciba Specialty Chemicals Inc.); a metallocene-based compound (for example, IRGACURE 784; manufactured by Ciba Specialty Chemicals Inc.); an iodonium salt (for example, IRGACURE 250; Ciba Specialty Chemicals Inc.); a mixture of one or more thereof (for example, DAROCUR 4265, IRGACURE 2022, IRGACURE 1300, IRGACURE 2005, IRGACURE 2010, IRGACURE 2020; manufactured by Ciba Specialty Chemicals Inc.); and the like. In the present invention, one or two or more of the photoinitiators may be used, but the photoinitiator is not limited thereto.

In an exemplary embodiment of the present specification, the photoinitiator may be included in an amount of 0.5 part by weight to 10 parts by weight, preferably 0.01 part by weight to 5 parts by weight based on 100 parts by weight of the active energy ray curable composition. When the photoinitiator is included in a content within the numerical range, ultraviolet rays reach the inside of the protective layer, the polymerization rate is excellent, and it is possible to prevent the molecular weight of a polymer to be produced from being decreased. For this reason, there is an advantage in that cohesive strength of a protective layer to be formed is excellent and bonding strength with respect to the polarizer is excellent.

In an exemplary embodiment of the present specification, it is preferred that the active energy ray curable composition has a glass transition temperature of 90° C. or more after curing, and the glass transition temperature may be, for example, 100° C. to 150° C. or 100° C. to 130° C.

In an exemplary embodiment of the present specification, it is preferred that the active energy ray curable composition has a viscosity of 50 cPs to 200 cPs at 25° C., and the viscosity may be, for example, 50 cPs to 130 cPs at 25° C. When the viscosity of the composition satisfies the numerical range, there is an advantage in that the protective layer may be thinly formed and the workability is excellent.

The viscosity is measured at room temperature (25° C.) by using a No. 18 spindle using a Brookfield viscometer (manufactured by Brookfield Industries, Inc.). In this case, the amount of the composition is appropriately 6.5 to 10 mL, and a stabilized numerical value is measured within 5 minutes in order to evade exposure to light for a long period of time.

In an exemplary embodiment of the present specification, the active energy ray curable composition may additionally comprise one or more additives selected from the group consisting of a dye, a pigment, a UV stabilizer, an antioxidant, a toning agent, a reinforcing agent, a filler, an antifoaming agent, a surfactant, a photosensitizer, and a plasticizer, if necessary.

Meanwhile, a method of forming the protective layer is not particularly limited, and the protective layer may be formed by a method well-known in the art. For example, the method may be performed as a method of applying the active energy ray curable composition on one surface of a polarizer by a coating method well-known in the art, for example, spin coating, bar coating, roll coating, gravure coating, blade coating, and the like to form a protective layer, and then curing the composition by irradiating the composition with ultraviolet rays. For example, the method may be performed as a method of irradiating the composition with ultraviolet rays which are irradiated lights by using an ultraviolet irradiation device.

A wavelength of the ultraviolet rays may be 100 nm to 400 nm, preferably 320 nm to 400 nm.

The light amount of light irradiated may be 100 mJ/cm$^2$ to 1,000 mJ/cm$^2$, preferably 500 mJ/cm$^2$ to 1,000 mJ/cm$^2$.

The irradiation time of light irradiated may be 1 second to 10 minutes, preferably 2 seconds to 30 seconds. When the irradiation time range is satisfied, there is an advantage in that it is possible to minimize traveling wrinkles from being generated in the polarizer by preventing heat from being excessively transferred from a light source.

In an exemplary embodiment of the present specification, the protective layer has a thickness of 4 µm to 11 µm, preferably 5 µm to 10 µm, and more preferably 6 µm to 8 µm. When the thickness of the protective layer is smaller than the range, there is a concern in that the strength or high temperature durability of the protective layer deteriorates, and when the thickness is higher than the range, the thickness is not suitable in terms of thinning a polarizing plate.

Protective Film

The protective film is for supporting and protecting a polarizer, and it is possible to use protective films of various materials generally known in the art, for example, a polyethylene terephthalate (PET) film, a cycloolefin polymer (COP) film, an acrylic film, and the like. Among them, it is particularly preferred that polyethylene terephthalate is used in consideration of optical characteristics, durability, economic feasibility, and the like.

In an exemplary embodiment of the present specification, the protective film may have a storage modulus of 1,500 MPa or more, preferably 1,800 MPa or more, and more preferably 2,000 MPa or more at 80° C. When the numerical range is satisfied, an effect of protecting the polarizer of the protective film may be enhanced. Specifically, it is possible to prevent tearing of the polarizer due to stress generated by shrinkage of the polarizer under a high temperature environment.

Meanwhile, attachment of the polarizer and the protective film may be performed by a method of coating a bonding agent composition for a polarizing plate on a surface of the polarizer or the protective film using a roll coater, a gravure coater, a bar coater, a knife coater, a capillary coater, or the like, and then heat-laminating the polarizer and the protective film using a laminated roll, or a method of pressing the polarizer and the protective film at room temperature to laminate the polarizer and the protective film or a method of irradiating the polarizer and the protective film with UV rays after laminating the polarizer and the protective film, and the like. The bonding agent composition for a polarizing plate will be described below.

Bonding Agent Layer

In an exemplary embodiment of the present specification, the bonding agent layer is a cured product of a polarizing plate bonding agent composition.

In an exemplary embodiment of the present specification, a thermal expansion coefficient of the bonding agent layer at 80° C. is 130 ppm/K or less.

In an exemplary embodiment of the present specification, when the thermal expansion coefficient is more than 130 ppm/K, there is a problem in that cracks occur on the polarizing plate under a heat resistant impact environment.

It is preferred that the bonding agent layer is formed of a photocurable bonding agent composition. As described above, when the bonding agent layer is a curable resin layer formed of a photocurable composition, there is an advantage in that the manufacturing method thereof is simple, and furthermore, adhesion with the protective film is excellent. Further, the durability of the polarizing plate may be further improved.

In this case, the photocurable bonding agent composition is not particularly limited as long as the thermal expansion coefficient satisfies the range, and may be, for example, a photocurable composition comprising an epoxy compound and an oxetane compound.

As the epoxy compound, it is possible to use at least one or more of an alicyclic epoxy compound and a glycidyl ether-type epoxy compound, and preferably, it is possible to use a mixture of an alicyclic epoxy compound and a glycidyl ether-type epoxy compound.

In an exemplary embodiment of the present specification, the alicyclic epoxy compound may be included in an amount of 10 wt % to 50 wt %, preferably 20 wt % to 40 wt %, based on the total weight of the epoxy compound. When the numerical range is satisfied, there is an advantage in that the composition may be effectively cured at the time of photo-curing the alicyclic epoxy compound.

In an exemplary embodiment of the present specification, the glycidyl ether-type epoxy compound may be included in an amount of 10 wt % to 60 wt %, preferably 20 wt % to 40 wt %, based on the total weight of the epoxy compound.

The oxetane compounds as described above may be used either alone or in mixture thereof, and the content thereof is preferably 10 to 50 parts by weight, and more preferably 28 to 40 parts by weight, based on 100 parts by weight of the epoxy compound. When the oxetane compound is included at an amount more than the range, there is a problem in that the bonding strength is decreased, and when the oxetane compound is included at an amount less than the range, there is a problem in that the viscosity is increased.

In an exemplary embodiment of the present specification, the photocurable bonding agent composition may additionally comprise one or more additives selected from the group consisting of a dye, a pigment, an epoxy resin, a UV stabilizer, an antioxidant, a toning agent, a reinforcing agent, a filler, an antifoaming agent, a surfactant, a photosensitizer, a photoinitiator, and a plasticizer, if necessary.

Polarizer

First, as the polarizer of the present invention, a polarizer well-known in the art, for example, a film composed of polyvinyl alcohol (PVA) comprising iodine or a dichroic dye may be used. The polarizer may be manufactured by dyeing iodine or a dichroic dye on a polyvinyl alcohol film, but the manufacturing method thereof is not particularly limited. In the present specification, the polarizer means a state in which a protective layer (or a protective film) is not included, and the polarizing plate means a state in which a polarizer and a protective layer (or a protective film) are included.

Meanwhile, the polarizer may have a thickness of 5 μm to 40 μm, more preferably 5 μm to 25 μm. When the thickness of the polarizer is smaller than the range, optical characteristics may deteriorate, and when the thickness of the polarizer is higher than the range, the amount of polarizer shrunk at low temperature (approximately −30° C.) is increased, so that there may be a problem with the heat resistance of the overall polarizing plate.

Meanwhile, when the polarizer is a polyvinyl alcohol-based film, the polyvinyl alcohol-based film may be used without particular limitation as long as the film comprises a polyvinyl alcohol resin or a derivative thereof. In this case, examples of the derivative of the polyvinyl alcohol resin comprise a polyvinyl formal resin, a polyvinyl acetal resin, and the like, but are not limited thereto. Alternatively, as the polyvinyl alcohol-based film, it is also possible to use a commercially available polyvinyl alcohol-based film generally used in the manufacture of a polarizer in the art, for example, P30, PE30 and PE60 manufactured by Kuraray Co., Ltd., M2000, M3000 and M6000 manufactured by Japan Synthetic Co., Ltd., and the like.

Meanwhile, the polyvinyl alcohol-based film may have a degree of polymerization of 1,000 to 10,000, preferably 1,500 to 5,000, but is not limited thereto. This is because when the degree of polymerization satisfies the range, molecules may freely move and be flexibly mixed with iodine or a dichroic dye, and the like.

Carrier Film

The present specification provides a polarizing plate-carrier film laminate further comprising: the above-described polarizing plate; and a carrier film on a surface opposite to a surface of the polarizing plate which is brought into contact with the polarizer.

The polarizing plate-carrier film laminate according to an exemplary embodiment of the present specification may comprise a carrier film.

In an exemplary embodiment of the present specification, the carrier film is not particularly limited, as long as the carrier film is easily peeled off in a process of manufacturing a polarizing plate. Examples thereof comprise polyethylene terephthalate, a cycloolefin polymer, polycarbonate, or triacetyl cellulose, and preferred examples thereof comprise polyethylene terephthalate. Polyethylene terephthalate is inexpensive, and thus has an advantage in that process costs may be reduced.

In an exemplary embodiment of the present specification, the carrier film is a polyethylene terephthalate film.

In an exemplary embodiment of the present specification, the carrier film may have a thickness of 10 µm to 150 µm, preferably 15 µm to 100 µm. When the thickness of the carrier film satisfies the numerical range, there are advantages in that it is possible to prevent wrinkles from being generated by swelling and/or shrinkage of the carrier film due to heat generated at the time of irradiation with ultraviolet rays, and it is possible to solve a problem in that an uncured part is generated because ultraviolet rays reach the protective layer well at the time of curing the protective layer by ultraviolet rays.

In an exemplary embodiment of the present specification, a light transmittance of the carrier film may be 70% to 100%. The light transmittance may be calculated by using a detector to detect light rays absorbed and emitted after irradiating the carrier film with a light ray having a wavelength of 200 nm to 800 nm using a UV-vis spectrophotometer, and then converting the light rays into a ratio.

When the numerical range is satisfied, there is an advantage in that at the time of irradiating a polarizing plate-carrier film laminate with ultraviolet rays in order to cure a protective layer and a bonding agent layer of the polarizing plate-carrier film laminate, curing may be efficiently performed because the ultraviolet rays reach the protective layer and the bonding agent layer well.

Primer Layer

In an exemplary embodiment of the present specification, the carrier film comprises: a base film; and a primer layer each provided on one surface or both surfaces of the base film.

In an exemplary embodiment of the present specification, one of the primer layers may be brought into contact with the protective layer of the polarizing plate-carrier film laminate.

The carrier film has a configuration in which at the time of manufacturing a polarizing plate, the carrier film is laminated with a protective layer of the polarizing plate, and may be peeled off and removed at the final step. Accordingly, the carrier film needs to have a low bonding strength of the polarizing plate with respect to the protective layer in order to facilitate the peeling, and for this purpose, a method of forming a resin layer such as silicone on a base film such as a polyethylene terephthalate film is publicly known.

Further, when the resin layer such as silicone is formed, when a composition for forming a polarizing plate protective layer is applied to the resin layer in the future, the coatability of the composition is low, so that there is a problem in that bubbles are generated in the protective layer or a problem in that de-wetting occurs.

When the base film (PET film) is subjected to corona treatment only without any separate treatment, oxalic acid and the like are generated by oxygen introduced during the corona treatment, so that oxalic acid and the like are generated as impurities, and for this reason, the yield of a product is reduced. When a separate cleaning process is provided, the workability deteriorates, and facility investment costs are generated.

In addition, when a silicone resin layer is formed on a base film, a protective layer composition is not uniformly coated due to the low surface energy, and an uncoated site is generated, so that there is a problem in that the workability deteriorates.

Thus, in the present invention, a primer layer comprising a water-dispersible polyurethane resin is introduced into a side of a base film which is brought into contact with a protective layer. When the water-dispersible polyurethane resin is provided on any one surface of the primer layer, the coatability is improved when a protective layer composition is applied onto a carrier film in the process of manufacturing a polarizing plate, so that it is possible to improve the processability of the process of manufacturing a polarizing plate. Furthermore, there is an advantage in that damage to the protective layer may be minimized at the time of peeling off the carrier film.

The water-dispersible polyurethane-based resin may be one or two or more selected from the group consisting of polyurethane, an ester-based polyurethane resin, a carbonate-based polyurethane resin, a silane-modified urethane resin, a urethane-acrylate copolymer, a vinyl-urethane copolymer, and a silicone-acryl-urethane copolymer.

In an exemplary embodiment of the present specification, the primer layer may comprise a water-dispersible primer composition comprising a water-dispersible polyurethane-based resin, or a cured product thereof. Curing of the water-dispersible primer composition will be described below.

The water-dispersible polyurethane resin may be included in an amount of 5 parts by weight to 50 parts by weight, preferably 10 parts by weight to 30 parts by weight, based on 100 parts by weight of the primer water-dispersible composition. When the above range is satisfied, the weather resistance of a primer layer to be formed in the future will be improved. The water-dispersible polyurethane resin may be present in a state of being dissolved or dispersed in an aqueous solvent.

A content of a solid content of the water-dispersible polyurethane resin may be 15% to 50%, preferably 15% to 45%, and more preferably 20% to 40%.

The water-dispersible polyurethane resin means a resin comprising a urethane repeating unit formed by reaction of an isocyanate and a polyol in the main chain thereof, and in this case, as the isocyanate, compounds having two or more —NCO groups may be used without limitation, and as the polyol, compounds comprising two or more hydroxyl groups, for example, a polyester-based polyol, a polycarbonate-based polyol, a polyether polyol, a siloxane-based polyol, and the like may be used without limitation.

As the isocyanate component, for example, it is possible to use one or a combination of two or more selected from the group consisting of toluene diisocyanate (TDI), 4,4-diphenyl methane diisocyanate (MDI), 1,5-naphthalene diisocyanate (NDI), tolidine diisocyanate (TODI), hexamethylene diisocyanate (HMDI), isophorone diisocyanate (IPDI), p-phenylene diisocyanate, trans-cyclohexane, 1,4-diisocyanate and xylene diisocyanate (XDI).

Meanwhile, the polyester-based polyol may be obtained by reacting a polybasic acid component with a polyol component, and in this case, examples of the polybasic acid component comprise: an aromatic dicarboxylic acid such as ortho-phthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid, andtetrahydrophthalic acid; an aliphatic dicarboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, and itaconic acid; an alicyclic dicarboxylic acid such as hexahydrophthalic acid, tetrahydrophthalic acid, 1,3-cyclohexane dicarboxylic acid, and 1,4-cyclohexane dicarboxylic acid; or a reactive derivative thereof such as an acid anhydride thereof, an alkyl ester thereof, and an acid halide thereof. These polybasic acid components may be used either alone or in combination of two or more thereof.

Meanwhile, the polycarbonate-based polyol may be obtained by reacting a compound having a carbonate group with the polyol component, and in this case, examples of the compound having a carbonate group comprise diphenyl carbonate, dialkyl carbonate, alkylene carbonate, and the like.

Further, the polyether polyol may be obtained by adding alkylene oxide to the polyol component via a ring-opening polymerization.

Meanwhile, the polyol component is not particularly limited as long as the polyol component has two or more hydroxyl groups in the molecule thereof, and any appropriate polyol may be adopted. For example, the polyol is preferably at least one selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxy methyl methane, diethylene glycol, triethylene glycol, polyethylene glycol (PEG), dipropylene glycol, polytetramethylene glycol (PTMG), polypropylene glycol (PPG), 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol. Among them, the polyol component is particularly preferably at least one selected from the group consisting of polytetramethylene glycol (PTMG), polypropylene glycol (PPG), and polyethylene glycol (PEG).

Furthermore, the water-dispersible polyurethane resin may additionally comprise other polyols or chain extenders in addition to the components within a range in which physical properties of the present invention are not impaired.

Here, the other polyols may be, for example, polyols having three or more hydroxyl groups, such as sorbitol, glycerin, trimethylolethane, trimethylolpropane, and pentaerythritol.

Further, as the other chain extenders, glycols such as ethylene glycol, diethylene glycol, triethylene glycol, 1,3-propanediol, 1,3-butanediol, 1,4-butanediol, neopentyl glycol, pentanediol, 1,6-hexanediol, and propyleneglycol, and the like may be used.

Meanwhile, the water-dispersible polyurethane resin may further comprise a neutralizing agent, if necessary. When the water-dispersible polyurethane resin comprises a neutralizing agent, the stability of the urethane resin in water may be improved. As the neutralizing agent, it is possible to use one or a combination of two or more of, for example, ammonia N-methylmorpholine, triethylamine, dimethylethanolamine, methyldiethanolamine, triethanolalkyne, morpholine, tripropylamine, ethanolamine, triisopropanolamine, and the like.

In addition, it is preferred that the preparation of the water-dispersible polyurethane resin is performed in an organic solvent which is inert to the isocyanate and compatible with water. As the corresponding organic solvent, it is possible to use one or a combination of two or more of an ester-based solvent such as ethyl acetate and ethyl cellosolve acetate; a ketone-based solvent such as acetone, methyl ethyl ketone, and methylisobutylketone; an ether-based solvent such as dioxane tetrahydrofuran; and the like.

Meanwhile, the water-dispersible polyurethane resin usable in the present invention may be prepared by using any appropriate method known in the art. Specific examples of the appropriate method comprise a one-shot method of reacting the each component at one time and a multi-step method of reacting the each component step by step. Furthermore, any appropriate urethane reaction catalyst may be used at the time of preparing the water-dispersible polyurethane resin.

Meanwhile, in the present invention, it is preferred that the water-dispersible polyurethane resin comprises a functional group such as a carboxyl group, a sulfonic acid base, a hydroxyl group, or a tertiary amine group. This is because when the functional groups are included in the water-dispersible polyurethane resin, bonding strength and water dispersibility for the bonding agent layer are improved. Meanwhile, the water-dispersible polyurethane resin comprising the functional group as described above may be prepared by a method of using a compound comprising the functional groups as the polyol and/or isocyanate, or adding a chain extender comprising the functional groups during the reaction of a polyol and an isocyanate. For example, the water-dispersible polyurethane resin comprising a carboxyl group or a tertiary amine group may be prepared by adding a chain extender having a free carboxyl group or a free amine group to perform a reaction during the reaction of a polyester polyol and an isocyanate. In this case, examples of the chain extender having a free carboxyl group comprise dihydroxy carboxylic acid, dihydroxy succinic acid, and the like. The dihydroxy carboxylic acid may be, for example, a dialkylol alkanoic acid comprising a dimethylol alkanoic acid such as dimethylol acetic acid, dimethylol butanoic acid, dimethylol propionic acid, dimethylol butyric acid, and dimethylol pentanoic acid. These acids may be used either alone or in combination of two or more thereof. Meanwhile, examples of the chain extender having a free amine group comprise an aliphatic diamine such as ethylene diamine, propylene diamine, hexamethylene diamine, 1,4-butanediamine, and aminoethylethanolamine; an alicyclic diamine such as isophorone diamine and 4,4'-dicyclohexylmethanediamine; an aromatic diamine such as xylylene diamine and tolylene diamine; and the like. These chain extenders may be used either alone or in combination of two or more thereof.

Meanwhile, the water-dispersible polyurethane resin is not limited to, but is particularly preferably a carbonate-based polyurethane resin which uses a polycarbonate-based polyol as a reactant, an ester-based polyurethane resin which uses a polyester-based polyol as a reactant, or a siloxane-based polyurethane resin which uses a siloxane-based polyol as a reactant, from the viewpoint of dispersibility and transparency.

Meanwhile, it is preferred that the water-dispersible polyurethane resin has a weight average molecular weight of 10,000 to 1,000,000. When the weight average molecular weight of the polyurethane resin satisfies the numerical range, there are effects in that sufficient bonding strength for a peeled film may be implemented, and water dispersibility is excellent.

The primer layer included in the polarizing plate-carrier film laminate according to an exemplary embodiment of the present specification is derived from a water-dispersible primer composition, and the water-dispersible primer composition may comprise a crosslinking agent.

The crosslinking agent may be included in a primer water-dispersible composition, thereby providing a more compact inner structure by forming a crosslinking structure of a urethane-based water-dispersible binder while improving bonding strength with a peeled film through a functional group.

The crosslinking agent may be one or two or more crosslinking agents selected from the group consisting of an isocyanate crosslinking agent, an oxazoline crosslinking agent, a carbodiimide crosslinking agent, a melamine crosslinking agent, and an epoxy crosslinking agent.

Examples of the isocyanate crosslinking agent comprise tolylene diisocyanate (TDI), diaryl isocyanate, diphenylmethane-4,4'-diisocyanate, diphenylmethane-2,4'-diisocyanate, xylene diisocyanate (XDI), meta-xylylene diisocyanate, hexamethylene-1,6-diisocyanate (HDI), 1,6-diisocyanate hexane, adducts of tolylene diisocyanate and hexanetriol, adducts of tolylene diisocyanate and trimethylol propane, polyol-modified diphenylmethane-4,4'-diisocyanate, carbodiimide-modified diphenylmethane-4,4'-diisocyanate, isophorone diisocyanate (IPDI), 1,5-naphtalene diisocyanate, 3,3'-bitolylene-4,4'-diisocyanate, 3,3'-dimethyldiphenylmethane-4,4'-diisocyanate, meta-phenylene diisocyanate, and the like.

The oxazoline crosslinking agent may be used without limitation as long as the oxazoline crosslinking agent is an oxazoline group-containing monomer, or a compound which comprises one or more of the monomer and has an oxazoline group such as a polymer compound in which one or more other monomers are copolymerized as a functional group. For example, it is possible to use a compound such as 2-vinyl-2-oxazoline, 2-vinyl-4-methyl-2-oxazoline, 2-vinyl-5-methyl-2-oxazoline, 2-isoprophenyl-2-oxazoline, 2-isoprophenyl-4-methyl-2-oxazoline, or 2-isoprophenyl-5-ethyl-2-oxazoline, or a polymer compound formed by polymerizing one or two or more of the above compounds. The polymer compound may be copolymerized with other comonomers, and examples of the comonomer comprise one or more selected from the group consisting of alkyl(meth)acrylate, an amide group-containing monomer, an unsaturated nitrile-based monomer, a vinyl ester-based monomer, a vinyl ether-based monomer, a halogen-containing α,β-unsaturated monomer, or an α,β-unsaturated aromatic monomer.

As the carbodiimide crosslinking agent, a carbodiimide compound, polycarbodiimide, or the like may be used, but the carbodiimide crosslinking agent is not limited thereto. Typically, the carbodiimide compound has a structure of the following Formula A1, and polycarbodiimide comprises a repeating structure such as the following Formula A2.

[Formula A1]

[Formula A2]

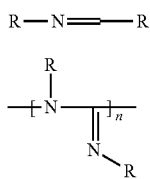

In Formulae A1 and A2, R is a publicly-known functional group which a carbodiimide compound or polycarbodiimide may comprise, and n is an integer of 2 or more.

As the melamine crosslinking agent, it is possible to use, for example, melamine, a methylolated melamine derivative obtained by condensing melamine and formaldehyde, a compound that is partially or completely etherified by reacting methylolated melamine and a lower alcohol, a mixture thereof, and the like.

The epoxy crosslinking agent is a crosslinking agent comprising an epoxy group in the molecule thereof, and for example, it is possible to use one or more selected from the group consisting of ethylene glycol-diglycidyl ether, polyethylene glycol-diglycidyl ether, polyglycerol polyglycidyl ether, triglycidyl ether, trimethylol propane triglycidyl ether, N,N,N',N'-tetraglycidyl ethylene diamine, glycerin diglycidyl ether, propylene glycol-diglycidyl ether, and polypropylene glycol-diglycidyl ether.

In an exemplary embodiment of the present specification, the crosslinking agent may be included in an amount of 110 parts by weight to 150 parts by weight, preferably 110 parts by weight to 130 parts by weight based on 100 parts by weight of the water-dispersible polyurethane-based resin. Within the above range, the crosslinking density of the primer layer may be appropriately adjusted, an appropriate bonding strength with a peeled film may be secured, coating film properties such as coatability, stretchability, blocking characteristics, and yellowing characteristics may be improved, and a prepolymer in which end groups of a polyurethane-based resin have isocyanate may also be easily prepared.

The primer layer included in the polarizing plate-carrier film laminate according to an exemplary embodiment of the present specification is derived from a water-dispersible primer composition, and the water-dispersible primer composition may comprise a water-dispersible fine particle. When the primer layer comprises a water-dispersible fine particle, the primer layer has characteristics in which appearance of the primer layer is clear and a haze value is low. Further, there is an effect in that the curing yield may be increased during the process of manufacturing a polarizing plate.

As the water-dispersible fine particle which may be used in the present invention, any appropriate fine particle may be used, and for example, an inorganic fine particle, an organic fine particle, or a combination thereof may be used. Examples of the inorganic fine particle comprise an inorganic oxide such as silica, titania, alumina, zirconia, and an antimony-based inorganic oxide, and the like. Examples of the organic fine particle comprise a silicone-based resin, a fluorine-based resin, a (meth)acrylic resin, a crosslinked polyvinyl alcohol, a melamine-based resin, and the like.

Among the water-dispersible fine particles, silica is particularly preferred. This is because silica is excellent in blocking suppression capability, rarely generates haze due to excellent transparency, and does not have any coloring, so that optical properties of a polarizing plate are less influenced by silica. Further, colloidal silica has good dispersibility and dispersion stability with respect to the primer composition, so that the workability at the time of forming a primer layer is also excellent.

Meanwhile, the water-dispersible fine particles have an average diameter (an average diameter of primary particles) of approximately 10 nm to 200 nm, more preferably approximately nm to 150 nm. When the average diameter of the water-dispersible fine particles is less than 10 nm, stability of the solution may be hindered since agglomeration and precipitation of the water-dispersible particles occur in the primer solution due to an increase in surface energy, and when the average diameter thereof is more than 200 nm, haze of the particles is increased by scattering light having a wavelength of 400 nm or more since the water-dispersible particles are not uniformly dispersed in the primer solution, and sizes of the water-dispersible particles are increased compared to a wavelength of visible light (400 nm to 800 nm) while the particles are agglomerated. By using fine particles having a particle diameter within the range described above to appropriately form irregularities on the surface of the primer layer, particularly, frictional force in the peeled film and the primer layer may be effectively reduced. As a result, it is possible to further improve blocking suppression capability.

Since the primer composition of the present invention is a water-based composition, the fine particles are preferably mixed as a water dispersion. Specifically, when silica is adopted as the fine particles, the fine particles are preferably blended as colloidal silica. Products commercially available in the art as colloidal silica may be used as they are, and it is possible to use, for example, Snowtex Series manufactured by Nissan Chemical Corporation, AEROSIL Series manufactured by Air Products & Chemicals, Epostar Series and Soliostar RA Series manufactured by Nippon Shokubai Co., Ltd., LSH Series manufactured by Ranco Co., Ltd., and the like.

In an exemplary embodiment of the present specification, the water-dispersible fine particles may be included in an amount of 1 part by weight to 10 parts by weight, preferably 2 parts by weight to 5 parts by weight based on 100 parts by weight of the water-dispersible polyurethane-based resin.

In an exemplary embodiment of the present specification, the water-dispersible fine particles may have an average particle diameter of 50 nm to 1,000 nm. The average particle diameter of the water-dispersible fine particles may be measured through a scanning electron microscope (SEM), and may be an average value of the particle diameter of the water-dispersible fine particles repeatedly measured twice or more.

The primer layer included in the polarizing plate-carrier film laminate according to an exemplary embodiment of the present specification is derived from a water-dispersible primer composition, and the primer water-dispersible composition may further comprise a wetting agent.

In an exemplary embodiment of the present specification, the primer layer may have a thickness of 50 nm to 200 nm, 60 nm to 180 nm, 80 nm to 160 nm, or 100 nm to 130 nm, and by adjusting the thickness of the primer layer within the above range, the excellent durability and weather resistance may be maintained while improving the bonding strength of the primer layer. However, the thickness of the primer layer is not limited to the above-described range, and may be appropriately adjusted, if necessary.

Manufacturing Method

The present specification provides a method for manufacturing the above-described polarizing plate-carrier film laminate.

The method for manufacturing a polarizing plate-carrier film may be performed by a roll-to-roll process. Since the method may be performed as a continuous process by using a roll-to-roll process, the production yield is high and the production unit price is reduced, so that there is an economic advantage.

The present specification provides a method for manufacturing a polarizing plate-carrier film laminate, the method comprising: supplying a carrier film to one surface of a polarizer; supplying a protective film to the other surface of the polarizer; forming a protective layer by supplying an active energy ray curable composition between the polarizer and the carrier film; forming a bonding agent layer by supplying a photocurable bonding agent composition between the polarizer and the protective film; pressurizing a laminate in which the carrier film, the protective layer, the polarizer, the bonding agent layer, and the protective film are sequentially laminated by disposing a pair of pressurization means on each surface of the carrier film and the protective film; and curing the protective layer and the bonding agent layer by irradiating the protective layer and the bonding agent layer with an active energy ray.

The method for manufacturing a polarizing plate-carrier film laminate according to an exemplary embodiment of the present specification may further comprise preparing a carrier film.

The preparing of the carrier film may further comprise providing a primer layer each on one surface or both surfaces of a carrier film by applying and drying a water-dispersible primer composition onto the carrier film on one surface or both surfaces of the carrier film.

That is, the method for manufacturing a polarizing plate-carrier film laminate according to an exemplary embodiment of the present specification may comprise a film supplying process and a pressurizing process.

Figure 4:
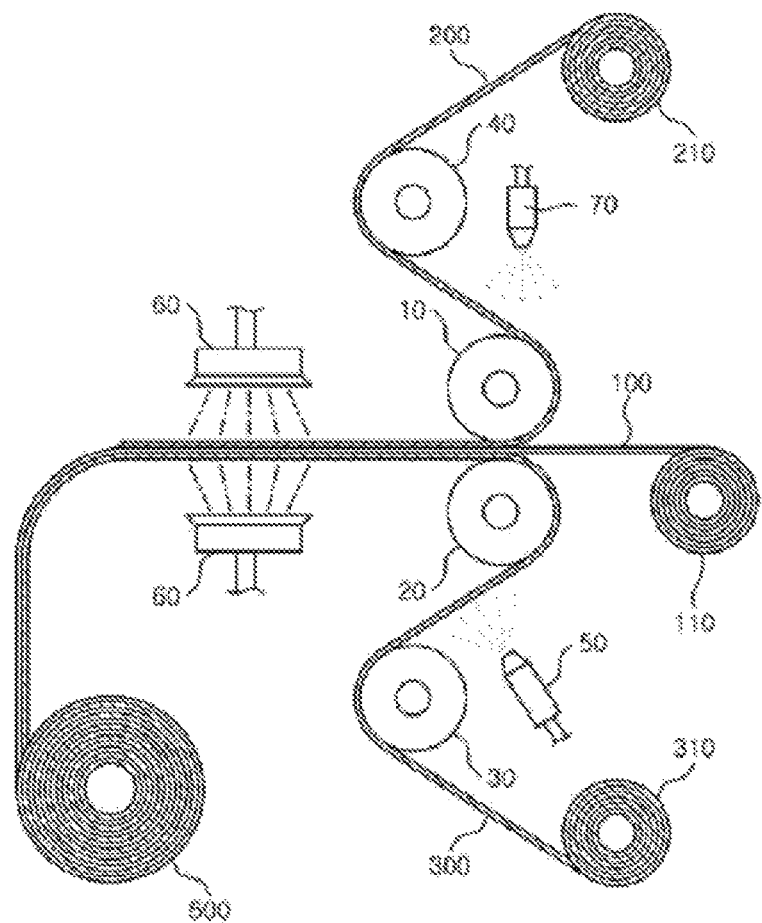
FIG. 4 illustrates an example of a method for manufacturing the polarizing plate-carrier film laminate according to an exemplary embodiment of the present specification.

In the method for manufacturing a polarizing plate-carrier film laminate according to an exemplary embodiment of the present specification as shown in FIG. 4, the film supplying process comprises: supplying a carrier film 200 on one surface of a polarizer 100; and supplying a protective film 300 on the other surface of the polarizer. Specifically, the method may be performed as a method of supplying the carrier film 200 on one surface of the polarizer 100, and simultaneously supplying the protective film 300 on the other surface of the polarizer 100.

The method of supplying the polarizer 100, the carrier film 200, and the protective film 300 may be performed by using a method well-known in the art. For example, the polarizer, the carrier film, and the protective film may be supplied in a form in which each film is wound around rolls (polarizer roll 110, carrier film roll 210, and protective film roll 310), but the supplying method is not limited thereto.

Further, when a carrier film is used as described above, it is possible to prevent other constitutions from being contaminated by a composition for forming a protective layer because the carrier film effectively protects a polarizer at the time of forming the protective layer, and the carrier film absorbs pressure applied by a pressurization means to alleviate stress acting on the polarizer, so that there is an effect of effectively suppressing breakage.

In an exemplary embodiment of the present specification, the rate of supplying each film is not particularly limited as long as the rate has a value appropriate for the manufacturing method, but for example, each film may be supplied at a rate of 1 M/min to 100 M/min. Preferably, each film may be supplied at a rate of 10 M/min to 50 M/min, and in this case, there is an advantage in that the carrier film and the protective film may be stably bonded to the polarizer.

In an exemplary embodiment of the present specification, the polarizer may be stretched. That is, according to the method for manufacturing a polarizing plate-carrier film laminate or a polarizing plate of the present specification, the polarizer may be further subjected to a process of stretching a polarizer before the process of supplying a polarizer. In the process of stretching a polarizer, the conditions and the like are not particularly limited.

In an exemplary embodiment of the present specification, the polarizer may have a thickness of 5 μm to 25 μm. The thickness of the polarizer means a thickness after stretching. When the thickness after stretching satisfies the numerical range, a thin polarizing plate having a small thickness is easily manufactured.

As the polarizer, a polyvinyl alcohol-based resin film in which molecular chains containing an iodine-based compound or a dichroic dye are oriented in a predetermined direction may be used. The polarizer may be manufactured by a method of dyeing iodine or a dichroic dye on a polyvinyl alcohol-based resin film, and then stretching and crosslinking the polyvinyl alcohol-based resin film in a predetermined direction.

In an exemplary embodiment of the present specification, the stretching process may be performed as wet stretching performed in a solution such as an aqueous boric acid solution or an aqueous iodine solution, dry stretching performed under the atmosphere, or the like.

In an exemplary embodiment of the present specification, the concentration of the aqueous boric acid solution or the aqueous iodine solution is not particularly limited, but may be, for example, 1% to 10%.

In an exemplary embodiment of the present specification, the stretch ratio of the stretching process may be 4 times or more, more specifically 4 times to 15 times or 4 times to 13 times.

In an exemplary embodiment of the present specification, the stretching process may be performed in a machine direction (MD) of the polyvinyl alcohol-based resin film.

In an exemplary embodiment of the present specification, a width of the carrier film may be larger than that of the polarizer. When the width of the carrier film is made to be larger than that of the polarizer, it is possible to effectively reduce contamination of a pressurization means and the like by an active energy ray curable composition or a bonding agent composition.

The method for manufacturing a polarizing plate according to an exemplary embodiment of the present specification comprises forming a protective layer by supplying an active energy ray curable composition between the polarizer and the carrier film.

The forming of the protective layer may be performed by a method of applying an active energy ray curable composition onto at least one of the bonded surface of the polarizer and the bonded surface of the carrier film in any step during the film supplying process. The surface onto which the active energy ray curable composition is applied is not limited, and for example, the active energy ray curable composition may be applied to the bonded surface of the carrier film.

In this case, a surface activation treatment such as a corona treatment, a plasma treatment, an ultraviolet ray irradiation treatment, or an electron beam irradiation treatment may be performed on the bonded surface of the carrier film onto which the active energy ray curable composition is applied before the active energy ray curable composition is applied.

In an exemplary embodiment of the present specification, the method of applying the active energy ray curable composition is not particularly limited as long as the method may uniformly apply a required amount of composition. Examples thereof comprise a method such as spin coating, bar coating, roll coating, gravure coating, and blade coating, and the method may be preferably performed by roll coating for a continuous process. The application may be performed through an application means 70 of a composition for forming a protective layer.

The method for manufacturing a polarizing plate according to an exemplary embodiment of the present specification comprises forming a bonding agent layer by supplying a photocurable bonding agent composition between the polarizer and the protective film.

The forming of the bonding agent layer may be performed by a method of applying a photocurable bonding agent composition onto at least one of the bonded surface of the polarizer and the bonded surface of the protective film in any step during the film supplying process. The surface onto which the photocurable bonding agent composition is applied is not limited, and for example, the active energy ray curable composition may be applied to the bonded surface of the protective film.

In an exemplary embodiment of the present specification, the method of applying the photocurable composition is not particularly limited as long as the method may uniformly apply a required amount of composition. Examples thereof comprise a method such as spin coating, bar coating, roll coating, gravure coating, and blade coating, and the method may be preferably performed by roll coating for a continuous process. The application may be performed through a bonding agent composition application means 50.

The method for manufacturing a polarizing plate according to an exemplary embodiment of the present specification comprises pressurizing a film laminate in which the carrier film, the polarizer, and the protective film are laminated by disposing a pair of pressurization means on each surface of the carrier film and the protective film. More specifically, the method may be performed by a pressurization method using a pair of pressurization means with the film laminate in which the carrier film, the polarizer, and the protective film are laminated therebetween. In this case, the pressurization means is not particularly limited, but for example, a bonding machine such as a laminator in a roll form or a pressurization roll 10 or 20 may be used.

In an exemplary embodiment of the present specification, the pressurizing of the laminate may be performed at a pressure of 0.5 MPa to 10 MPa or 1 MPa to 8 MPa. When the numerical range is satisfied, there are advantages in that it is possible to secure a stable traveling performance without damaging the polarizer and to effectively remove bubbles flowing in at the time of bonding the film.

The method for manufacturing a polarizing plate according to an exemplary embodiment of the present specification comprises curing the protective layer and the bonding agent layer by irradiating the protective layer and the bonding agent layer with an active energy ray.

In an exemplary embodiment of the present specification, the curing of the active energy ray curable composition and the photocurable bonding agent composition by irradiating the protective layer and the bonding agent layer with the active energy ray may be performed by a method for irradiating the active energy ray curable composition and the photocurable bonding agent composition with an irradiation light by using an active energy ray irradiation device. That is, the method may be performed through an active energy ray irradiation means 60.

The active energy ray irradiation means is not particularly limited, and examples thereof comprise a fusion lamp, an arc lamp, an LED, and a low-pressure lamp.

Since the method for manufacturing a polarizing plate-carrier film laminate according to an exemplary embodiment of the present specification irradiates a polarizer laminate on which a protective layer and a bonding agent layer are formed with an active energy ray, there is an advantage in that it is possible to simultaneously cure the protective layer and the bonding agent layer by irradiating the protective layer and the bonding agent layer with an active energy ray once.

The light amount of active energy ray may be 100 mJ/cm$^2$ to 1,000 mJ/cm$^2$, preferably 500 mJ/cm$^2$ to 1,000 mJ/cm$^2$, and the irradiation time of light irradiated may be 1 second to 10 minutes, preferably 2 seconds to 30 seconds.

When the light amount and irradiation time ranges of the active energy ray are satisfied, there is an advantage in that productivity is excellent because the curing rates of the bonding agent layer and the protective layer are high, and generation of travelling wrinkles on the polarizer is minimized by preventing heat from being excessively transferred from a light source without making appearance characteristics and optical characteristics of the film deteriorate.

Furthermore, the irradiation direction of the active energy ray is not particularly limited as long as the protective layer and the bonding agent layer may be sufficiently cured, but the irradiation of the protective layer and the bonding agent layer with the active energy ray may be preferably performed on the surface of the carrier film of the polarizing plate-carrier film laminate.

An exemplary embodiment of the present specification may comprise winding the manufactured polarizing plate-carrier film laminate. In this case, a polarizing plate winding roll 500 may be used.

The present specification provides a method for manufacturing a polarizing plate, the method comprising: peeling off the carrier film from the protective layer of the above-described polarizing plate-carrier film laminate.

The present specification provides a method for manufacturing a polarizing plate, and the method for manufacturing a polarizing plate comprises: manufacturing the above-described polarizing plate-carrier film laminate; and peeling off a carrier film from the protective layer of the polarizing plate-carrier film laminate.

The method for manufacturing a polarizing plate according to an exemplary embodiment of the present specification comprises peeling off the carrier film from the protective layer of a polarizing plate-carrier film laminate (hereinafter, referred to as a peeling process).

In an exemplary embodiment of the present specification, the peeling off of the carrier film may be performed by a roll-to-roll process.

In an exemplary embodiment of the present specification, the method for manufacturing a polarizing plate comprises storing the polarizing plate-carrier film laminate before the peeling process.

According to an exemplary embodiment of the present specification, the storing of the polarizing plate-carrier film laminate may be performed at room temperature (25° C.) and a relative humidity of 30% to 50% for 1 hour to 100 hours.

In an exemplary embodiment of the present specification, a rate in change B1 of the peel strength of the protective layer with respect to the carrier film according to the following Conversion Equation 1 may be 300% or less, preferably 250% or less, and more preferably 200% or less.

$$B1 = \frac{\sqrt{(X3' - X3)^2}}{X3} \times 100(\%) \quad \text{[Conversion Equation 1]}$$

In Conversion Equation 1, X3' is a bonding strength X3' of a protective layer with respect to a carrier film after the storing of the polarizing plate-carrier film laminate is performed, and X3 is a peel strength X3 of the protective layer with respect to the carrier film before the storing of the polarizing plate-carrier film laminate is performed.

In an exemplary embodiment of the present specification, a rate in change B2 of the peel strength of a protective layer with respect to a polarizer according to the following Conversion Equation 2 may be 0.05% or less.

$$B2 = \frac{\sqrt{(X1' - X1)^2}}{X1} \times 100(\%) \quad \text{[Conversion Equation 2]}$$

In Conversion Equation 2, X1' is a peel strength X1' of a protective layer with respect to a polarizer after the storing of the polarizing plate-carrier film laminate is performed, and X1 is a peel strength X1 of the protective layer with respect to the polarizer before the storing of the polarizing plate-carrier film laminate is performed.

In an exemplary embodiment of the present specification, the peeling process may be performed by a roll-to-roll process. The roll-to-roll process means a process that is performed by a method of winding a peeled carrier film by peeling off the carrier film around a carrier film winding roll and simultaneously winding a polarizing plate in which the carrier film is peeled off around a winding roll.

Since a film supplying process, a pressurization process, and a peeling process may be simultaneously performed as a continuous process by using a roll-to-roll process in the method for manufacturing a polarizing plate according to an exemplary embodiment of the present specification as described above, there is an advantage in that the production yield is high and the method is very economical.

The method for manufacturing a polarizing plate according to an exemplary embodiment of the present specification may further comprise a process of forming an adhesive agent layer on a protective layer. The adhesive agent layer has a configuration provided to adhere a polarizing plate to a liquid crystal display device such as a liquid crystal panel.

The process of forming an adhesive agent layer is not particularly limited, and may be performed, for example, by a method of bonding a separate adhesive film onto a protective layer, or applying an adhesive agent composition onto a protective layer.

In an exemplary embodiment of the present specification, the method of applying the adhesive agent composition onto the protective layer is not particularly limited as long as the method may uniformly apply a required amount of composition. Examples thereof comprise a method such as spin coating, bar coating, roll coating, gravure coating, and blade coating, and the method may be preferably performed by roll coating for a continuous process.

In this case, a surface activation treatment such as a corona treatment, a plasma treatment, an ultraviolet ray irradiation treatment, or an electron beam irradiation treatment may be performed on the protective layer onto which the adhesive agent composition is applied before the adhesive agent composition is applied.

Polarizing Plate

The present specification provides a polarizing plate manufactured by the above-described method for manufacturing a polarizing plate.

The polarizing plate has a structure in which a carrier film is peeled off from the above-described polarizing plate-carrier film laminate.

Specifically, the polarizing plate has a structure comprising: a polarizer 1; a bonding agent layer and a protective film 3 sequentially provided on one surface of the polarizer 1; and a protective layer 2 provided on the other surface of the polarizer 1 (see FIG. 1).

Composition for Forming Protective Layer

The present specification provides an active energy ray curable composition for a polarizing plate protective layer, comprising an epoxy compound (A), an oxetane compound (B), and a modified siloxane compound (C).

The epoxy compound (A), the oxetane compound (B), and the modified siloxane compound (C) are the same as those described above.

Adhesive Agent Layer

In an exemplary embodiment of the present specification, the polarizing plate may further comprise an adhesive agent layer on a surface opposite to a surface of a protective layer which is brought into contact with a polarizer.

Meanwhile, the polarizing plate of the present invention may comprise an adhesive agent layer on the upper portion of the protective layer, if necessary, in order to be attached to a display device panel or an optical film such as a phase difference film.

In this case, the adhesive agent layer may be formed by using various adhesive agents well-known in the art, and the type thereof is not particularly limited. For example, the adhesive agent layer may be formed by using a rubber-based adhesive agent, an acrylic adhesive agent, a silicone-based adhesive agent, a urethane-based adhesive agent, a polyvinyl alcohol-based adhesive agent, a polyvinyl pyrrolidone-based adhesive agent, a polyacrylamide-based adhesive agent, a cellulose-based adhesive agent, a vinylalkyl ether-based adhesive agent, and the like. Among them, it is particularly preferred to use an acrylic adhesive agent in consideration of transparency, heat resistance, and the like.

Meanwhile, the adhesive agent layer may also be formed by a method of applying an adhesive agent onto the upper portion of the protective layer, and may also be formed by a method of attaching an adhesion sheet, which is manufactured by applying an adhesive agent onto a release sheet, and then drying the adhesive agent, onto the upper portion of the protective layer.

Image Display Device

The polarizing plate of the present invention as described above may be usefully applied to an image display device such as a liquid crystal display device.

The image display device comprises: a liquid crystal panel; an upper polarizing plate provided on an upper surface of the liquid crystal panel; and a lower polarizing plate provided on a lower surface of the liquid crystal panel.

Figure 3:
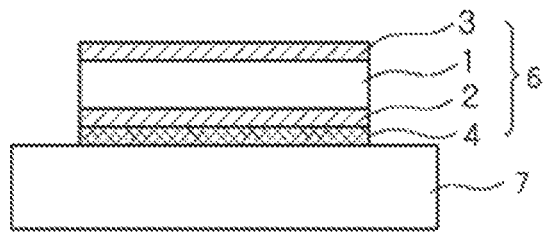
FIG. 3 is a cross-sectional view illustrating an aspect in which the polarizing plate according to an exemplary embodiment of the present specification is attached to an image display panel.

FIG. 3 illustrates that a polarizing plate 6 comprising: a polarizer 1; a bonding agent layer and a protective film 3 sequentially provided on one surface of the polarizer 1; and a protective layer 2 provided on the other surface of the polarizer is attached to a image display panel 7 through an adhesive agent layer 4.

The image display device according to an exemplary embodiment of the present specification comprises: a liquid crystal panel; an upper polarizing plate provided on an upper surface of the liquid crystal panel; and the polarizing plate according to the present specification as a lower polarizing plate provided on a lower surface of the liquid crystal panel.

The image display device according to an exemplary embodiment of the present specification comprises: a liquid crystal panel; the polarizing plate according to the present specification as an upper polarizing plate provided on an upper surface of the liquid crystal panel; and a lower polarizing plate provided on a lower surface of the liquid crystal panel.

The image display device according to an exemplary embodiment of the present specification comprises: a liquid crystal panel; an upper polarizing plate provided on an upper surface of the liquid crystal panel; and a lower polarizing plate provided on a lower surface of the liquid crystal panel, in which the upper polarizing plate and the lower polarizing plate are the polarizing plate according to the present specification.

In this case, the type of liquid crystal panel included in the liquid crystal display device is not particularly limited. For example, publicly-known panels, such as a passive matrix-type panel such as a twisted nematic (TN), super twisted nematic (STN), ferroelectric (F) or polymer dispersed (PD) panel; an active matrix-type panel such as a two terminal or three terminal panel; and an in-plane switching (IPS) panel and a vertical alignment (VA) panel, may be all applied without being limited in type. Furthermore, other configurations constituting the liquid crystal display device, for example, the kind of upper or lower substrate (for example, a color filter substrate or an array substrate) is not particularly limited, and a configuration publicly-known in the art may be employed without limitation.

MODE FOR INVENTION

Hereinafter, the present specification will be described in more detail through Examples. However, the following Examples are provided for exemplifying the present specification, and the scope of the present specification is not limited thereby.

EXPERIMENTAL EXAMPLES

Preparation Examples (1) Preparation Example 1: Production of Active Energy Ray Curable Composition 1

A composition was produced by mixing 3,4-epoxycyclohexylmethyl-3',4'-epoxycyclohexanecarboxylate (trade name CEL-2021) with 23 parts by weight of 3-ethyl-3-[(3-ethyloxetane-3-yl)methoxymethyl]oxetane (Aron Oxetane OXT-221 manufactured by Toagosei Co., Ltd.), 30 parts by weight of 1,4-cyclohexyl dimethanol diglycidyl ether (CHDMDGE), and 0.6 part by weight of a polyether modified siloxane compound (OFX-0400) based on 100 parts by weight of 3,4-epoxycyclohexylmethyl-3',4'-epoxycyclohexanecarboxylate. A final active energy ray curable composition 1 was produced by mixing 3 parts by weight of Irgacure 250 as a photoinitiator and 1 part by weight of ESACURE ITX as a photosensitizer based on 100 parts by weight of the composition.

(2) Preparation Example 2: Production of Active Energy Ray Curable Composition 2

An active energy ray curable composition 2 was produced in the same manner as in Preparation Example 1, except that the part by weight of the polyether modified siloxane compound was changed into 3 parts by weight based on 100 parts by weight of 3,4-epoxycyclohexylmethyl-3',4'-epoxycyclohexanecarboxylate (3) Preparation Example 3: Production of Active Energy Ray Curable Composition 3

An active energy ray curable composition 3 was produced in the same manner as in Preparation Example 1, except that the part by weight of the polyether modified siloxane compound was changed into 6.15 parts by weight based on 100 parts by weight of 3,4-epoxycyclohexylmethyl-3',4'-epoxycyclohexanecarboxylate (4) Preparation Example 4: Production of Active Energy Ray Curable Composition 4

An active energy ray curable composition 4 was produced in the same manner as in Preparation Example 1, except that the part by weight of the polyether modified siloxane compound was changed into 9.2 parts by weight based on 100 parts by weight of 3,4-epoxycyclohexylmethyl-3',4'-epoxycyclohexanecarboxylate.

(5) Preparation Example 5: Production of Active Energy Ray Curable Composition 5

An active energy ray curable composition 5 was produced in the same manner as in Comparative Example 1, except that the polyether modified siloxane compound was not added.

(6) Preparation Example 6: Production of Photocurable Bonding Agent Composition

A photocurable bonding agent composition was produced by adding 3 parts by weight of Irgacure 250 as a photoinitiator and 1 part by weight of ESACURE ITX as a photosensitizer to 100 parts by weight of a photocurable composition comprising 30 parts by weight of 3,4-epoxycyclohexylmethyl-3',4'-epoxycyclohexanecarboxylate (trade name Celloxide-2021), 20 parts by weight of 3-ethyl-3-[(3-ethyloxetane-3-yl)methoxymethyl]oxetane (Aron Oxetane OXT-221 manufactured by Toagosei Co., Ltd.), 40 parts by weight of 1,4-cyclohexyl dimethanol diglycidyl ether (CHDMDGE), and 10 parts by weight of nonanediol diacrylate.

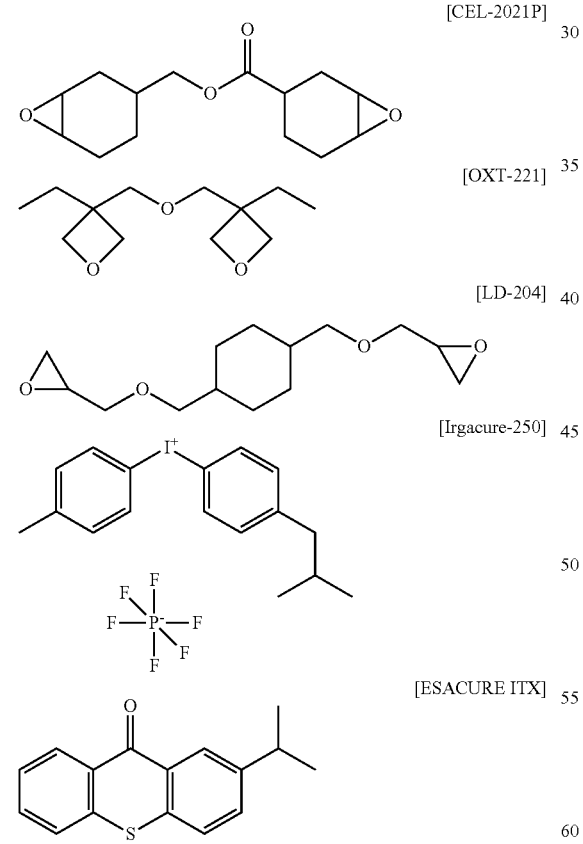

Example 1-Manufacture of Polarizing Plate-Carrier Film Laminate 1

While a polyvinyl alcohol-based film having a thickness of 23 μm was allowed to move at a rate of 10 meter/min in a horizontal direction under an atmosphere of 25° C., a carrier film (trade name H34L, manufactured by Kolon Industries, Inc.) having a primer layer comprising a polyurethane water-dispersible resin formed was supplied to the upper surface of the polyvinyl alcohol film and a polyethylene terephthalate film (PET, manufactured by Toyobo, Co., Ltd., Japan) as a protective film was supplied to the lower surface of the polyvinyl alcohol-based film, and the resulting film was allowed to pass through a pair of rolls at a rate of 10 meter/min and a pressure of 2 MPa. In this case, the UV ray curable bonding agent composition produced in Preparation Example 6 was applied to a thickness of about 3 μm between the polyvinyl alcohol-based film and the protective film by using a Mayor bar. Further, the active energy ray curable composition 1 was applied to a thickness of about 5 μm between the polyvinyl alcohol-based film and the carrier film by using a Mayor bar.

Thereafter, the laminate was cured by irradiating the side of the carrier film with ultraviolet rays using one or a plurality of UV light sources such as a fusion lamp, an arc lamp, LED, and a low-pressure lamp, thereby manufacturing a polarizing plate-carrier film laminate 1.

Example 2-Manufacture of Polarizing Plate-Carrier Film Laminate 2

A polarizing plate-carrier film laminate 2 was manufactured in the same manner as in Example 1, except that an active energy ray curable composition 2 was used instead of the active energy ray curable composition 1.

Example 3-Manufacture of Polarizing Plate-Carrier Film Laminate 3

A polarizing plate-carrier film laminate 3 was manufactured in the same manner as in Example 1, except that an active energy ray curable composition 3 was used instead of the active energy ray curable composition 1.

Reference Example 1-Manufacture of Polarizing Plate-Carrier Film Laminate 4

A polarizing plate-carrier film laminate 4 was manufactured in the same manner as in Example 1, except that an active energy ray curable composition 4 was used instead of the active energy ray curable composition 1.

Comparative Example 1-Manufacture of Polarizing Plate-Carrier Film Laminate 5

A polarizing plate-carrier film laminate 5 was manufactured in the same manner as in Example 1, except that an active energy ray curable composition 5 was used instead of the active energy ray curable composition 1.

Comparative Example 2-Manufacture of Polarizing Plate-Carrier Film Laminate 6

A polarizing plate-carrier film laminate 6 was manufactured in the same manner as in Comparative Example 2, except that as the carrier film, a PET film (trade name XE50, manufactured by Toray Industries, Inc.) in which a primer layer was not provided was used.

Experimental Example 1: Carrier Film Blocking Phenomenon Test

Each film roll was formed by winding each of the polarizing plate-carrier film laminates manufactured in Examples 1 to 3, the Reference Example, and Comparative Examples 1 and 2 around a roll so as to have a sample length of 5 cm in a direction perpendicular to the winding direction. Thereafter, the carrier film was peeled off at an angle of 180° and a rate of 30 m/min by using a high-speed peeling machine. In this case, the peeling was evaluated by classifying the appearance of the film into Lv. 0 to Lv. 3.

*Lv. 0: A clean state in which there is nothing wrong with the appearance of both the polarizer and the carrier film Lv. 1: A state in which there is nothing wrong with the appearance of the polarizer, but the surface of the peeled carrier film is modified Lv. 2: A state in which the surface of the polarizer is modified Lv. 3: A state in which the carrier film is torn without being peeled off In addition, after the carrier film peeling test was performed, a rate of change in haze as compared to the initial haze value was measured by measuring an internal haze of the carrier film by a haze meter (manufacturer: SECOS Co., Ltd.) in order to confirm whether the peeled carrier film was cleanly peeled off. The internal haze means the degree of cloudiness or turbidity and was measured as a haze in the transmission mode, and the degree thereof was expressed as a rate of change (%) in haze as compared to the initial haze value.

Experimental Example 2: High Temperature Acceleration Evaluation

A polarizing plate was manufactured in the same manner as in the polarizing plate as manufactured above, except that before a protective layer was formed, cracks were caused on the polarizer by scratching the other surface of a surface of the polarizer in which the protective film was laminated at a load of 300 g using a blunt pencil.

Thereafter, after a polarizing plate in which cracks were caused on the polarizer was cut into a width of 120 mm and a length of 100 mm, and then left to stand at 80° C. for 100 hours to 300 hours, it was observed whether cracks were widened by the shrinkage of the polarizer and light leaked from the cracks, and the rate of cracks generated in the polarizing plate was derived by calculating the number of cracks through which light leaked among the total cracks, and are shown in the following Table 2.

*Rate of cracks generated: number of cracks through which light leaks/the number of total cracks× 100(%)

Experimental Example 3: Peel Strength Test of Protective Layer

For the polarizing plate, the bonding strength (X1) of a protective layer with respect to a polarizer was measured by using the above-described cross-cut tape test, and the peel strength (X3: gf/5 cm) of the protective layer with respect to a carrier film was measured by using a film high-speed peeling machine (CBT-4720, Chungbuk Tech). The methods and conditions are the same as those described above, and the results are shown in the following Table 2.

TABLE 2

| | | | Reference Example | Comparative Example 1 | Comparative Example 2 | Example 1 | Example 2 | Example 3 |
|---|---|---|---|---|---|---|---|---|
| Protective layer composition | | | Composition 4 | Composition 5 | Composition 5 | Composition 1 | Composition 2 | Composition 3 |
| Type of carrier film | | | PET having a urethane-based primer layer formed | PET having a urethane-based primer layer formed | PET | PET having a urethane-based primer layer formed | PET having a urethane-based primer layer formed | PET having a urethane-based primer layer formed |
| Experimental Example 1 | 5 days later | Appearance after peeling | Lv. 0 | Lv. 0 | Lv. 2 | Lv. 0 | Lv. 0 | Lv. 0 |
| | | Rate of change in haze (%) | 0.05% or less | 0.05% | 3% | 0.05% or less | 0.05% or less | 0.05% or less |
| | 14 days later | Appearance after peeling | Lv. 0 | Lv. 1 | Lv. 2 | Lv. 1 | Lv. 0 | Lv. 0 |
| | | Rate of change in haze (%) | 0.05% or less | 0.5% | 5% or more | 0.4% | 0.1% | 0.05% or less |
| Experimental Example 2 | | Rate of cracks generated | 40% | 0% | 0% | 0% | 0% | 0% |
| Experimental Example 3 | | X3 | Not measured | 50 | 300 or more | 40 | 30 | 25 |
| | | X1 | Not measured | 5B | 4B | 5B | 5B | 5B |

From the experimental results, it could be confirmed that the blocking phenomenon occurred at the time of peeling off the carrier film because the peel strength (X3) of the protective layer with respect to the carrier film was high in the Comparative Examples. In contrast, it could be confirmed that the blocking phenomenon was minimized at the time of peeling off the carrier film because the peel strength of the protective layer with respect to the carrier film was small in the Examples. It could be confirmed that in the polarizing plate-carrier film laminates according to Comparative Examples 1 and 2, the appearance was modified after the carrier film was peeled off, or the haze value was increased.

In contrast, in the case of the polarizing plate-carrier film laminates according to Examples 1 to 3, it could be confirmed that even though the carrier film was peeled off, the appearance was not modified or was scarcely modified, and the haze value was not significantly increased. This is because the protective layers of the polarizing plate-carrier film laminates according to Examples 1 to 3 comprise a modified siloxane compound, the peel strength of the protective layer with respect to the carrier film was low, and a phenomenon in which the carrier film and the protective layer adhered to each other, that a blocking phenomenon was effectively suppressed.

In addition, it can be confirmed that when the content of the polyether modified siloxane compound included in the protective layer is adjusted, the high temperature durability is further improved. It can be confirmed that in the case of Reference Example in which the modified siloxane compound (C) is included in an amount of 9.2 parts by weight based on 100 parts by weight of the epoxy compound (A), the rate of cracks generated is higher than those in Examples 1 to 3 in which the modified siloxane compound (C) is included in an amount of 6.8 parts by weight or less based on 100 parts by weight of the epoxy compound (A).

The invention claimed is:

1. A polarizing plate comprising:
   a polarizer;
   a bonding agent layer and a protective film sequentially provided on one surface of the polarizer; and
   a protective layer which is directly attached to the other surface of the polarizer,
   wherein the protective layer is a resin layer comprising an active energy ray curable composition comprising an epoxy compound, an oxetane compound, and a polyether-modified siloxane compound in an amount of 0.01 to 6.8 parts by weight based on 100 parts by weight of the epoxy compound, or a cured product thereof.

2. The polarizing plate of claim 1, wherein a bonding strength of the protective layer with respect to the polarizer is 4B or more when measured by an ASTM standard cross-cut tape test in accordance with D3359-87.

3. The polarizing plate of claim 1, wherein the epoxy compound comprises an alicyclic epoxy compound or a glycidyl either epoxy compound.

4. The polarizing plate of claim 1, wherein the epoxy compound is a mixture of an alicyclic epoxy compound and a glycidyl either epoxy compound.

5. The polarizing plate of claim 1, wherein the epoxy compound comprises an alicyclic epoxy compound and a glycidyl ether epoxy compound at a weight ratio of 1:1 to 10:1.

6. The polarizing plate of claim 1, wherein the protective layer has a thickness of 4 μm to 11 μm.

7. The polarizing plate of claim 1, wherein the polarizer is a polyvinyl alcohol-based film.

8. A polarizing plate-carrier film laminate comprising:
   the polarizing plate according to claim 1; and
   a carrier film on a surface opposite to a surface of the polarizing plate which is in contact with the polarizer.

9. The polarizing plate-carrier film laminate of claim 8, wherein X2, calculated according to the following General Equation 1, is 0.95 to 1:

[General Equation 1]
X2=(Area of the remaining protective layer after the ASTM standard cross-cut tape test)/(Area of the entire peeled surface).

10. The polarizing plate-carrier film laminate of claim 8, wherein a peel strength of the protective layer with respect to the carrier film is 40 gf/5 cm or less.

11. The polarizing plate-carrier film laminate of claim 8, wherein the carrier film is a polyethylene terephthalate film.

12. The polarizing plate-carrier film laminate of claim 8, wherein the carrier film comprises: a base film, and a primer layer each provided on one surface or both surfaces of the base film.

13. A method for manufacturing the polarizing plate-carrier film laminate according to claim 8, comprising:
   supplying a carrier film to a first surface of a polarizer;
   supplying a protective film to a second surface of the polarizer;
   forming a protective layer by supplying an active energy ray curable composition between the polarizer and the carrier film;
   forming a bonding agent layer by supplying a photocurable bonding agent composition between the polarizer and the protective film;
   pressurizing a laminate in which the carrier film, the protective layer, the polarizer, the bonding agent layer, and the protective film are sequentially laminated by disposing a pair of pressurization means on each surface of the carrier film and the protective film; and
   curing the protective layer and the bonding agent layer by irradiating the protective layer and the bonding agent layer with an active energy ray.

14. The method of claim 13, wherein the active energy ray curable composition has a viscosity of 50 cps to 200 cps at room temperature.

15. A method for manufacturing a polarizing plate, comprising: peeling off the carrier film from the protective layer of the polarizing plate-carrier film laminate according to claim 8.

16. A polarizing plate manufactured by the method of claim 15, comprising:
   a polarizer;
   a bonding agent layer and a protective film sequentially provided on one surface of the polarizer; and
   a protective layer provided on the other surface of the polarizer and directly attached to the polarizer.

17. An active energy ray curable composition for a polarizing plate protective layer according to claim 1.

18. The polarizing plate of claim 1, wherein the polyether-modified siloxane compound comprises:

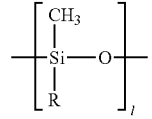

wherein l is an integer of 1 to 5 and R is a polyether group.